United States Patent
Kulkarni et al.

(10) Patent No.: US 10,496,162 B2
(45) Date of Patent: Dec. 3, 2019

(54) CONTROLLING A COMPUTER USING EYEGAZE AND DWELL

(71) Applicant: Microsoft Technology Licensing, LLC, Redmond, WA (US)

(72) Inventors: Harish Sripad Kulkarni, Redmond, WA (US); Dwayne Lamb, Sammamish, WA (US); Ann M Paradiso, Shoreline, WA (US); Eric N Badger, Redmond, WA (US); Jonathan Thomas Campbell, Redmond, WA (US); Peter John Ansell, Seattle, WA (US); Jacob Daniel Cohen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 15/660,678

(22) Filed: Jul. 26, 2017

(65) Prior Publication Data

US 2019/0033964 A1    Jan. 31, 2019

(51) Int. Cl.
*G06F 17/00* (2019.01)
*G06F 3/01* (2006.01)
(Continued)

(52) U.S. Cl.
CPC .......... *G06F 3/013* (2013.01); *G06F 3/04812* (2013.01); *G06F 3/04842* (2013.01); *G06F 3/0486* (2013.01)

(58) Field of Classification Search
CPC .... G06F 3/013; G06F 3/04842; G06F 3/0486; G06F 3/04812
See application file for complete search history.

(56) References Cited

U.S. PATENT DOCUMENTS 6,152,563 A * 11/2000 Hutchinson ............ A61B 3/113
                                                      351/209
6,243,076 B1 * 6/2001 Hatfield ................. G06F 3/013
                                                      345/156

(Continued)

OTHER PUBLICATIONS

Wankhede, et al., "Controlling Mouse Cursor Using Eye Movement", In International Journal of Application or Innovation in Engineering & Management—Special Issue for National Conference on Recent Advances in Technology and Management for Integrated Growth, Dec. 9, 2013, 7 pages.

(Continued)

*Primary Examiner* — Laurie A Ries
(74) *Attorney, Agent, or Firm* — Schwegman Lundberg & Woessner, P.A.

(57) ABSTRACT

The systems and methods described herein assist persons with the use of computers based on eye gaze, and allow such persons to control such computing systems using various eye trackers. The systems and methods described herein use eye trackers to control cursor (or some other indicator) positioning on an operating system using the gaze location reported by the eye tracker. The systems and methods described herein utilize an interaction model that allows control of a computer using eye gaze and dwell. The data from eye trackers provides a gaze location on the screen. The systems and methods described herein control a graphical user interface that is part of an operating system relative to cursor positioning and associated actions such as Left-Click, Right-Click, Double-Click, and the like. The interaction model presents appropriate user interfaces to navigate the user through applications on the computing system.

20 Claims, 24 Drawing Sheets

(51) Int. Cl.
   *G06F 3/0481* (2013.01)
   *G06F 3/0484* (2013.01)
   *G06F 3/0486* (2013.01)

(56) References Cited

U.S. PATENT DOCUMENTS

| | | | | |
|---|---|---|---|---|
| 6,351,273 | B1* | 2/2002 | Lemelson | G06F 3/013 704/271 |
| 7,561,143 | B1* | 7/2009 | Milekic | G06F 3/013 345/156 |
| 9,075,453 | B2* | 7/2015 | Bhaskar | G06F 3/012 |
| 9,454,225 | B2* | 9/2016 | Bychkov | G06F 3/013 |
| 9,552,064 | B2* | 1/2017 | He | G06K 9/0061 |
| 2005/0047629 | A1* | 3/2005 | Farrell | G06F 3/013 382/117 |
| 2012/0272179 | A1* | 10/2012 | Stafford | G06F 3/012 715/781 |
| 2013/0091515 | A1* | 4/2013 | Sakata | H04N 17/04 725/10 |
| 2013/0235347 | A1* | 9/2013 | Hennessey | G06F 3/013 351/210 |
| 2014/0049462 | A1* | 2/2014 | Weinberger | G06F 3/013 345/156 |
| 2014/0333535 | A1* | 11/2014 | Stafford | G06F 3/012 345/158 |
| 2016/0116980 | A1* | 4/2016 | George-Svahn | G06F 3/013 345/168 |
| 2016/0195924 | A1* | 7/2016 | Weber | G06F 3/0304 345/156 |
| 2017/0075420 | A1* | 3/2017 | Yu | G06F 3/013 |
| 2017/0108924 | A1* | 4/2017 | Hurter | G06F 3/013 |

OTHER PUBLICATIONS

Gantyala, et al., "Controlling Mouse Events Using Eye Blink", In International Journal of Advanced Research in Computer and Communication Engineering, vol. 5, Issue 3, Mar. 2016, pp. 754-756.

Chaudhari, et al., "Virtual Mouse Using Eye Tracking Technique", In International Journal of Emerging Research in Management &Technology, vol. 4, Issue 2, Feb. 2015, pp. 8-11.

* cited by examiner

CONTROLLING A COMPUTER USING EYEGAZE AND DWELL

BACKGROUND

Technology such as gaze trackers may be utilized to assist users in using computing devices. An eye tracking device measures the user's gaze location in comparison with items that are displayed on the operating system of the computer. Measuring the user's gaze location in comparison with an indicator does not necessarily provide an accurate gaze tracking. The results from following the eye gaze may not be satisfactory, because the human eye does not typically have enough control to maneuver a cursor (or some other indicator) on a user interface produced by an operating system.

SUMMARY

The systems and methods described herein assist persons with the use of computers based on eye gaze, and allow such persons to control such computing systems using various eye trackers. The systems and methods described herein use eye trackers to control cursor (or some other indicator) positioning on an operating system using the gaze location reported by the eye tracker. The systems and methods described herein utilize an interaction model that allows control of a computer (e.g., an operating system on the computer) using eye gaze and dwell.

The data from eye trackers provides a gaze location on the screen. The systems and methods described herein control a graphical user interface (GUI) that is part of an operating system relative to cursor positioning and associated actions such as Left-Click, Right-Click, Double-Click, and the like. The interaction model presents appropriate user interfaces to navigate the user through applications on the computing system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In cases where a user wants or needs to use eye tracking to interact with a personal computer without the aid of a secondary input device for clicking, dwell time is often used to determine if the user intends to interact with a particular target. Targeting eye gaze is often difficult on its own due to factors like small target sizes, and areas of the screen (like edges and corners) that can be very difficult to reach due to hardware or user ability limitations. Therefore, a need exists for ways to assist the user with gaze-plus-dwell computer interactions to make the experience more accurate and more comfortable. Techniques described herein use eye gaze and dwell to operate a computing system. Using eye gaze and dwell to modify content on a display of a user device enables users to interact with user devices without physically (e.g., by hand, physical interaction, etc.) interacting with the user devices. Users may manipulate content on displays of user devices without using their hands or other input devices (e.g., stylus, mouse, etc.).

Unlike current techniques, the techniques described herein avoid problems related to imprecise eye tracking and consequential unpredictable scrolling behavior. The techniques described herein require less tracking precision than current techniques when manipulating content on a display. Furthermore, the techniques described herein enable the use of less accurate or less precise tracking components and accordingly, reduce consumption of computational resources.

In various forms, the computing systems and methods described herein comprise an improved gaze-plus-dwell approach to help users by providing an indirect gaze control. An indirect indicator control window appears over the initial target location. The indirect indicator control window provides the user a way to indirectly position the cursor by dwelling over the navigation areas of the indirect indicator control window to navigate the indicator position to an intended location.

Figure 1:
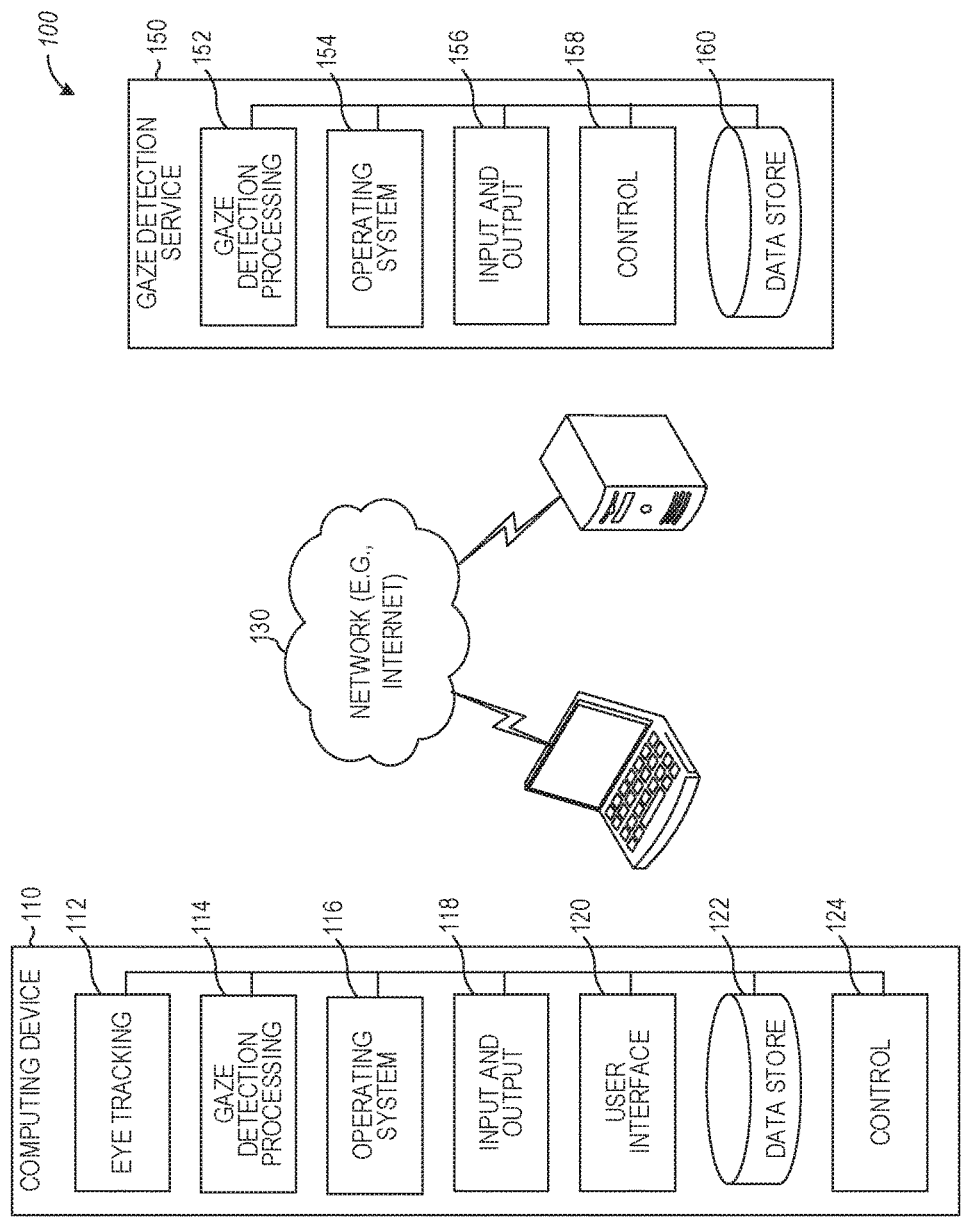
FIG. 1 shows a schematic of a computing device and a network-based device according to examples of the present disclosure.

Disclosed in various examples are methods, systems, devices, and machine-readable medium that provide a method for operating a computing system using gaze tracking. FIG. 1 shows a schematic of a computing device 110 and a network-based gaze detection service 1150 according to examples of the present disclosure.

As previously noted, in an example, the functionality as described herein may be implemented solely on the user's computing device (e.g., computing device 110), but in other examples, some functionality may be handled by a network-based gaze detection service 150. The components of FIG. 1 may be configured to communicate with each other, for example, via a network coupling (such as network 130), shared memory, a bus, a switch, and the like. It will be appreciated that each component may be implemented as a single component, combined into other components, or further subdivided into multiple components. Any one or more of the components described herein may be implemented using hardware (e.g., a processor of a machine) or a combination of hardware and software (for example machine 2400 of FIG. 24).

Eye tracking 112 and/or gaze detection processing 114 may control and process input from a gaze tracking device used to select options, register control points, and other inputs from the user described herein. In other examples, other components or modules may be included in place of or in addition to eye tracking 112 to process other types of inputs. For example, a head mouse component may control and process input.

The one or more eye tracking component(s) 112 may comprise Tobii Rex eye tracking systems. In at least one example, the one or more eye tracking component(s) 112 may leverage gaze sensing techniques such as those designed to detect when a user U is looking directly at a camera, employing alternative on-axis and off-axis infrared illuminant and image processing, etc. In an example, one or more cameras and/or sensors may be placed around a boundary of a display to determine when a user U is focusing in a region of the display and/or has reached a certain position that may be presented on the display (see, e.g., sensor 202, display 203 and user interface 204 in FIGS. 3-10). The precision and/or accuracy of the one or more tracking components(s) 112 and/or gaze detection processing 114 may be below a predetermined threshold such that the one or more eye tracking component(s) 112 may minimally be able to determine proper gaze coordinates.

In at least one example, the display may represent a user interface 120 and the user interface 120 may present content to a user U. The display may present electronic content representative of documents, content associated with a webpage, etc. In an example, the content may include text, images, videos, etc. In additional or alternative examples, the content may be arranged serially such that when a user reads and/or views the content, the user reads and/or views the content in a left to right and top to bottom progression.

Input and output 118 may control and receive gaze data from one or more devices (e.g., a scanner, a camera, or the like). In an example, the input and output 118 may also communicate with a gaze detection service, such as to send gaze data and to receive processed gaze data.

Gaze detection processing 114 may receive input and output 118 during gazing to create processed gaze data. In an example, example gaze detection processing 114 may perform some, or all, of the methods of FIGS. 21-23. In other examples, the operating system 116 may process the gaze detection data to perform some, or all, of the methods of FIGS. 21-23.

User interface 120 may provide one or more user interfaces for the computer system 100 utilizing gaze detection. For example, user interfaces shown in FIGS. 4, 6-9, 12-17 and 19-20. Data store 122 may be an example of one or more components that store information related to the use of an operating system 116 that generates the user interface 120 based on the gaze interaction. As an example, the data store 122 may store records for multiple users such that a particular user's preference is stored (e.g., relative to the operating system 116). Control 124 may interact with various modules to provide for operation of computing device 110 using gaze tracking. As examples, the control 124 may implement FIGS. 2-20 with the assistance of other components or modules. As an example, the eye tracking 112 may pass received gaze location input to the control 124. Gaze detection processing 114 may process gaze tracking data for use during operation of the computing device 110 by the operating system 116. Likewise, the control 124 may calculate cursor speed, location and dwell time. The control 124 may also perform one or more actions based upon the dwell time and location of the user's gaze.

Figure 2:
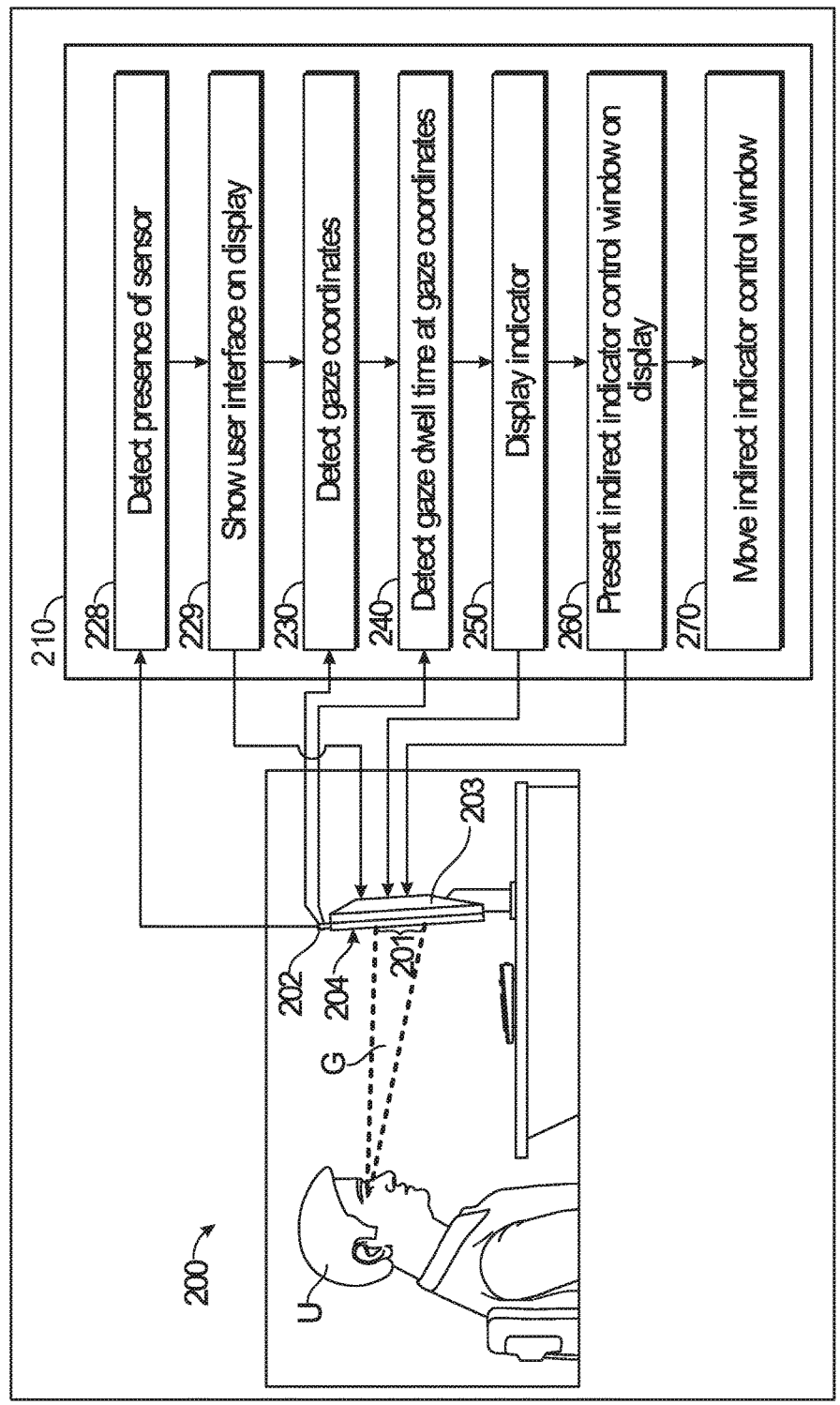
FIG. 2 shows a diagram of a computing system that is being operated by gaze control according to examples of the present disclosure.
Figure 24:
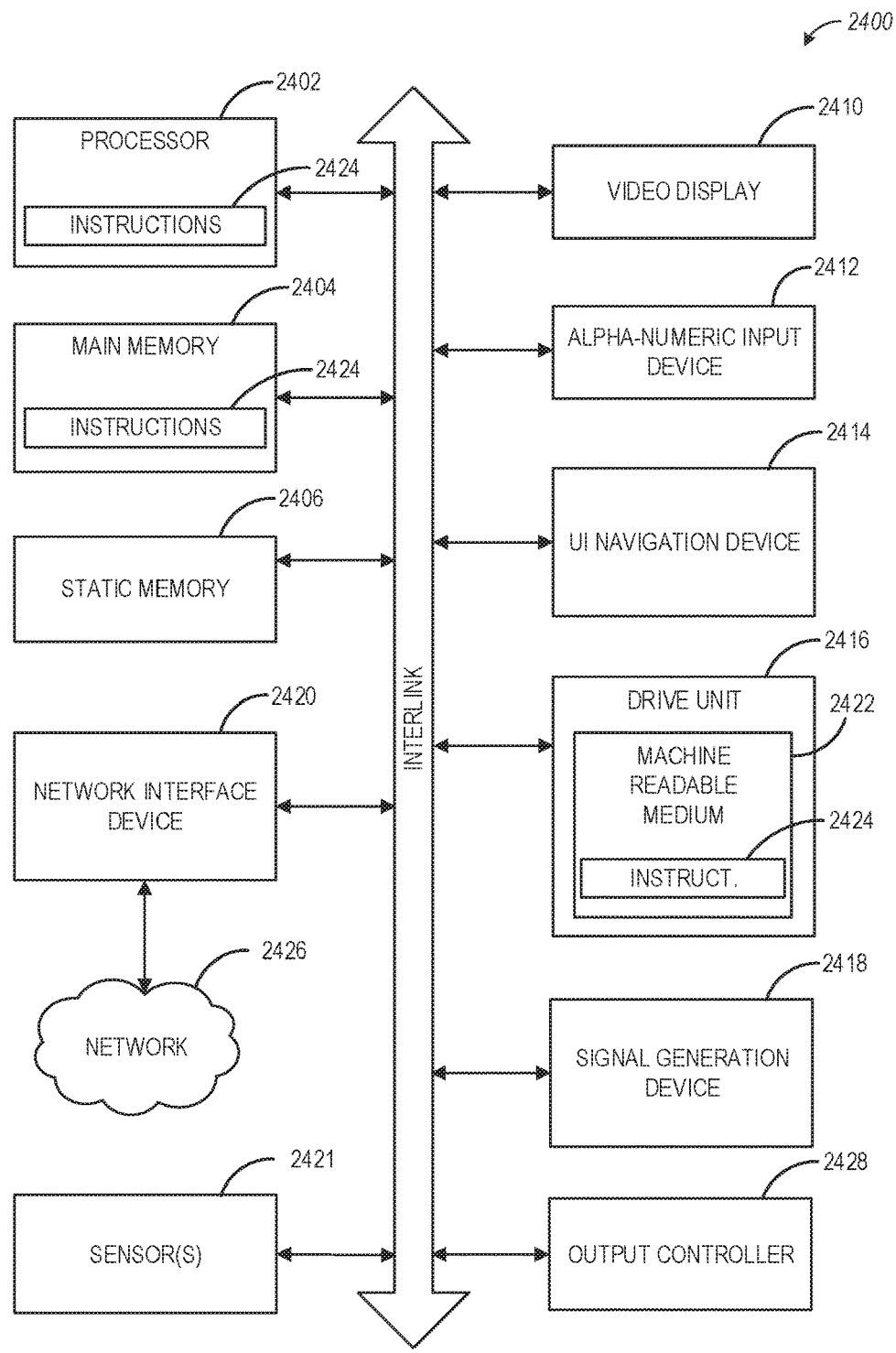
FIG. 24 is a block diagram illustrating an example of a machine upon which one or more embodiments may be implemented.

In an example, the components of FIG. 2 are similar to the example components of FIGS. 1 and 24. FIG. 2 shows a diagram 200 of a computing system 210 that is being operated by gaze control according to examples of the present disclosure.

Figure 3:
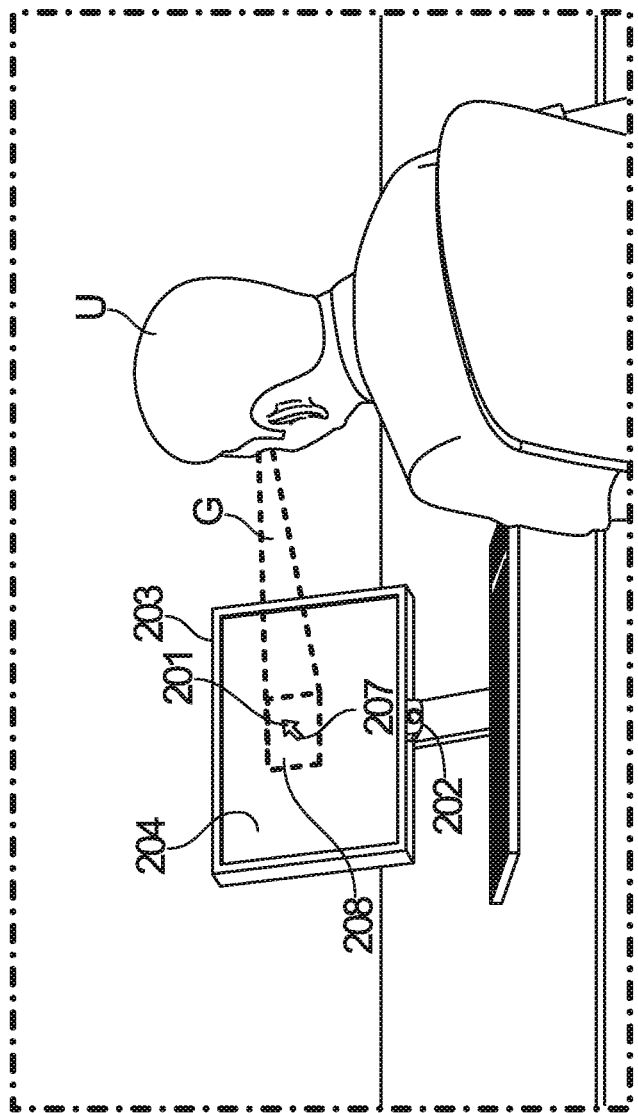
FIG. 3 illustrates a user controlling a computing system using eye gaze.
Figure 4:
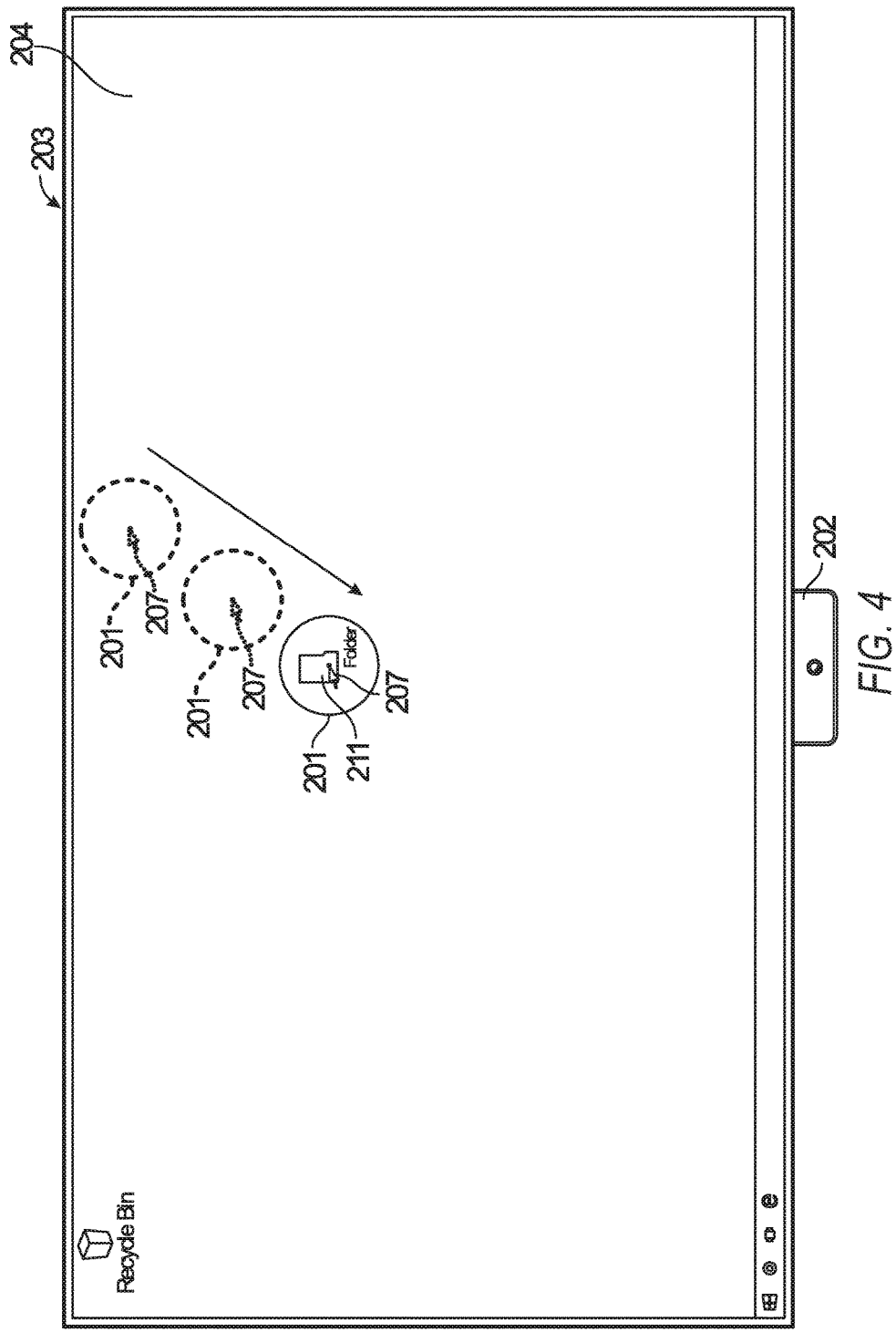
FIG. 4 illustrates the display of FIG. 3 where gaze tracking is used to place a cursor near an item.

The computing system 210 may include a processor (e.g., for example the processor 2402 shown in FIG. 24) and a memory (e.g., memory 2404 or 2406 in FIG. 24) that is communicatively coupled to the processor and may include instructions that when executed by the processor cause the computing system 210 to perform operations related to operating the computing system 210. As also shown in FIG. 3, the computing system 210 includes a display 203 and sensor 202 that observes a gaze G of a user U at a user interface 204 on the display 203. The computing system 100, 200 receives [230] data from a sensor 202 that observe a gaze G of a user U. As shown in FIG. 4, the gaze coordinates 201 move as the user's U gaze G moves on the user interface 204. The sensor 202 may exchange input and output 118 with the computing system 100, 200 (e.g., processor 2402) in order to detect [240] the user's U gaze G within a threshold distance of the gaze coordinates 201 for at least at least a predetermined period of time (e.g., dwell time).

The computing system 210 (e.g., the operating system 116) may show an appropriate user interface 204 when the user's U gaze G meets (or exceeds) the predetermined time. As shown in FIGS. 4 and 6-9, the operating system 116 of the computing system 100, 200 displays [250] an indicator 207 as an object within the user interface 204 at the gaze coordinates 201 once the user's U gaze G occurs for at least the predetermined time period at the gaze coordinates 201; and presents [260] an indirect indicator control window 206 on the user interface 204. The indirect indicator control window 206 includes a transparent section to allow a user U to see an area 208 of the user interface 204 at the gaze coordinates 201.

Figure 5:
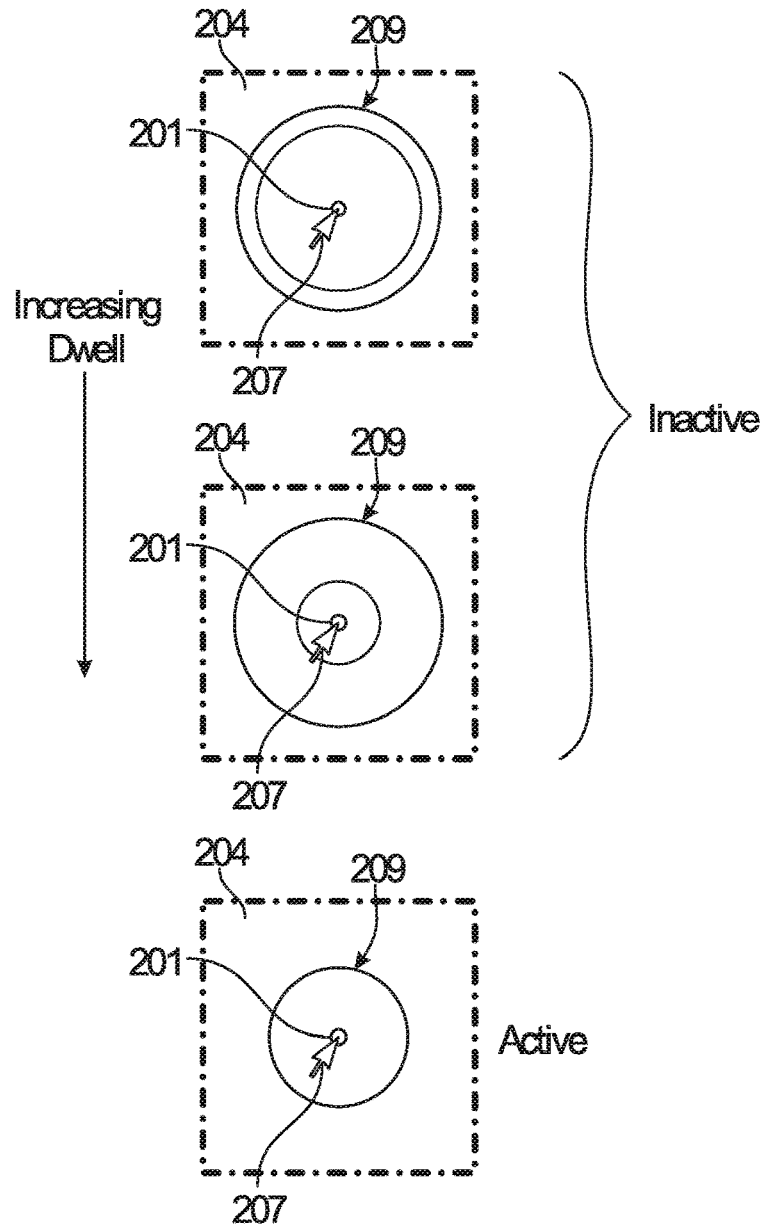
FIG. 5 illustrates a portion of a graphical user interface illustrating progression of the dwell of a user's gaze until the dwell exceeds a threshold period of time.

FIG. 5 shows an example gaze indicator 209 that may be used to provide the user with feedback as to where the user U is gazing G on the user interface 204. The longer the user U holds their gaze steady (or dwells) on a particular location the smaller the dwell state indicator gets until the operating system 116 eventually triggers the indirect indicator control window 206.

As an example, the indirect indicator control window 206 may include control objects 212A, 212B, 212C, 212D [270] that, in response to being selected by the gaze G of the user U, move the indirect indicator control window 206 within the user interface 204.

In the illustrated example form, the control objects 212A, 212B, 212C, 212D include direction buttons that move the indirect indicator control window 206 within the user interface 204 when selected by the gaze G of the user U. It should be noted that although the indicator 207 is illustrated in the figures as a cursor, the indicator 207 may take other forms.

Figure 6:
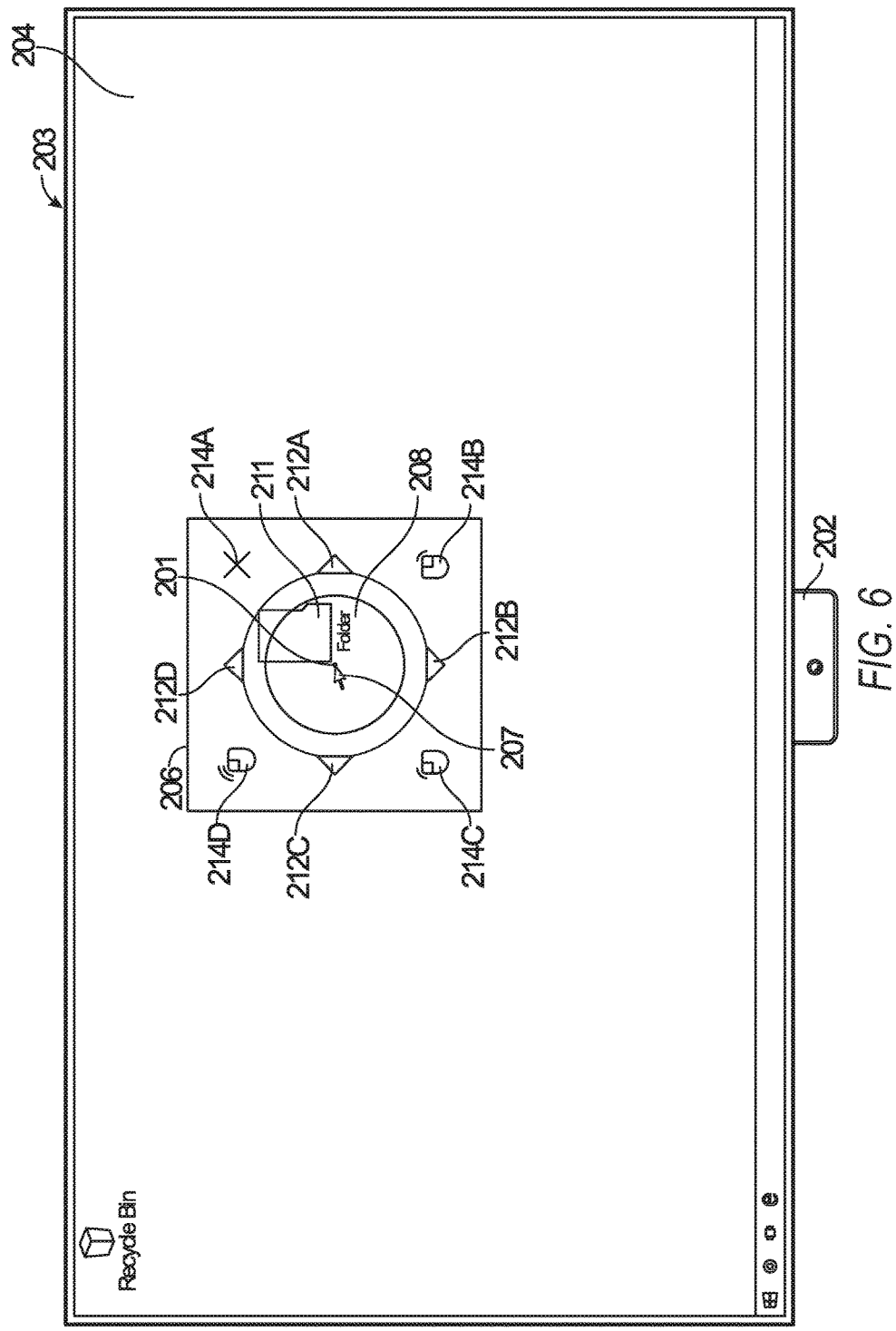
FIG. 6 illustrates an example indirect indicator control window that is shown on a user interface when a user's gaze exceeds the threshold period of time at a particular location.
Figure 7:
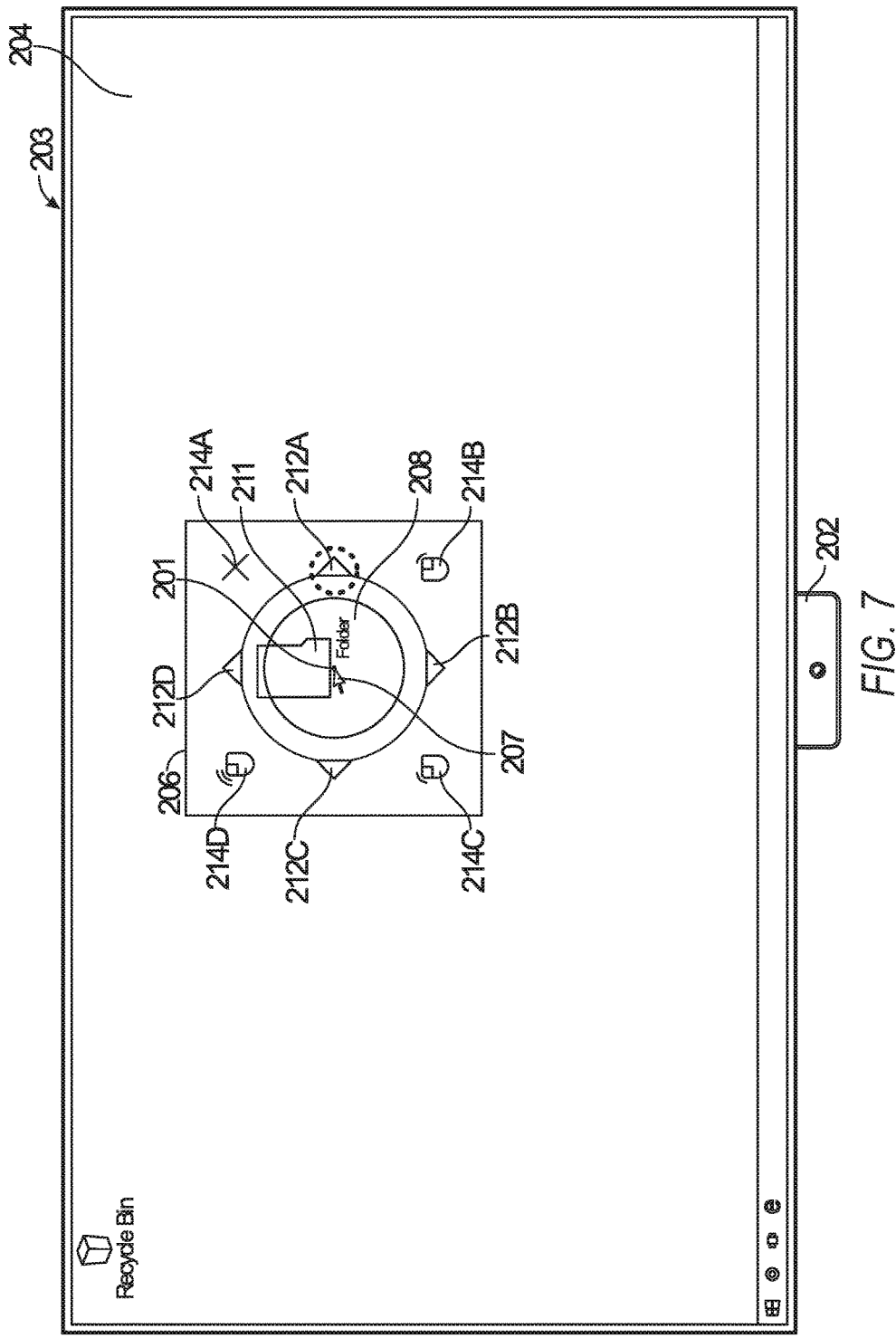
FIG. 7 illustrates the user interface of FIG. 6 where the indirect indicator control window has been maneuvered horizontally.
Figure 8:
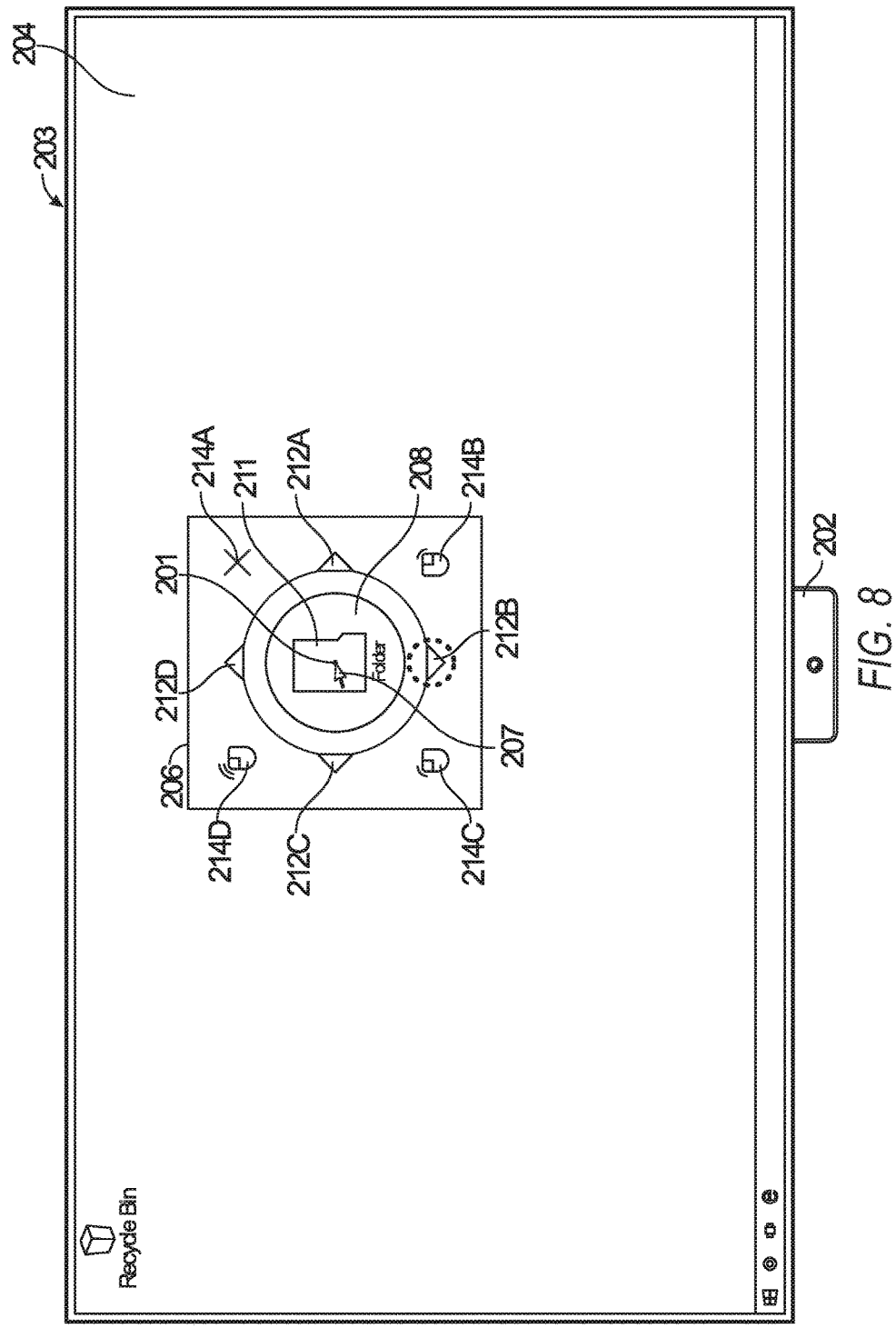
FIG. 8 shows the user interface of FIG. 7 where the indirect indicated control window has been moved vertically in order to align an item on the user interface relative to a cursor.

In various examples, the computing system 210 may perform operations before the sensor 202 is used to observe a gaze G of a user U at the user interface 204. As an example, one or more portions of the computing system 210 may perform operations such as [228] detecting the presence of the sensor 202 that observes the gaze G of the user U. In addition, the computing system 210 (e.g., the operating system 116) may show [229] the user interface 204 on the display 203 such that the user interface 204 includes at least one item 211 that supports gaze interaction with the user interface 204 when the control object 212A, 212B, 212C, 212D is activated by the user's U gaze G. As shown in FIGS. 6-8, in an example, the control objects 212A, 212B, 212C, 212D are navigation buttons that are shown located about the displayed area 208.

FIG. 6 illustrates an example indirect indicator control window 206 that is shown on a user interface 204 when a user's gaze exceeds the threshold period of time at particular gaze coordinates 201. FIG. 7 illustrates the user interface 204 of FIG. 6 where the indirect indicator control window 206 has been maneuvered horizontally by selecting control object 212A. FIG. 8 shows the user interface 204 of FIG. 7 where the indirect indicator control window 206 has been moved vertically by selecting control object 212B in order to align an item 211 on the user interface 204 relative to a cursor 207. The control objects 212A, 212B, 212C, 212D provide the user with a way to use gaze with extended dwell to navigate in four different directions (e.g., Up, Down, Left, Right) as the selected control object quickly but gradually moves the indirect indicator control window 206 (and thereby the indicator 207) to a desired location.

It should be noted that other forms are contemplated where indirect indicator control window 206 is also initiated on the user interface (e.g., by the operating system 116) by directly gazing at an associated button on the user interface 204 and then immediately gazing in the vicinity of the desired item 211 which is where the indirect indicator control window 206 will appear to assist the user in fine tuning the gaze interaction.

Figure 9:
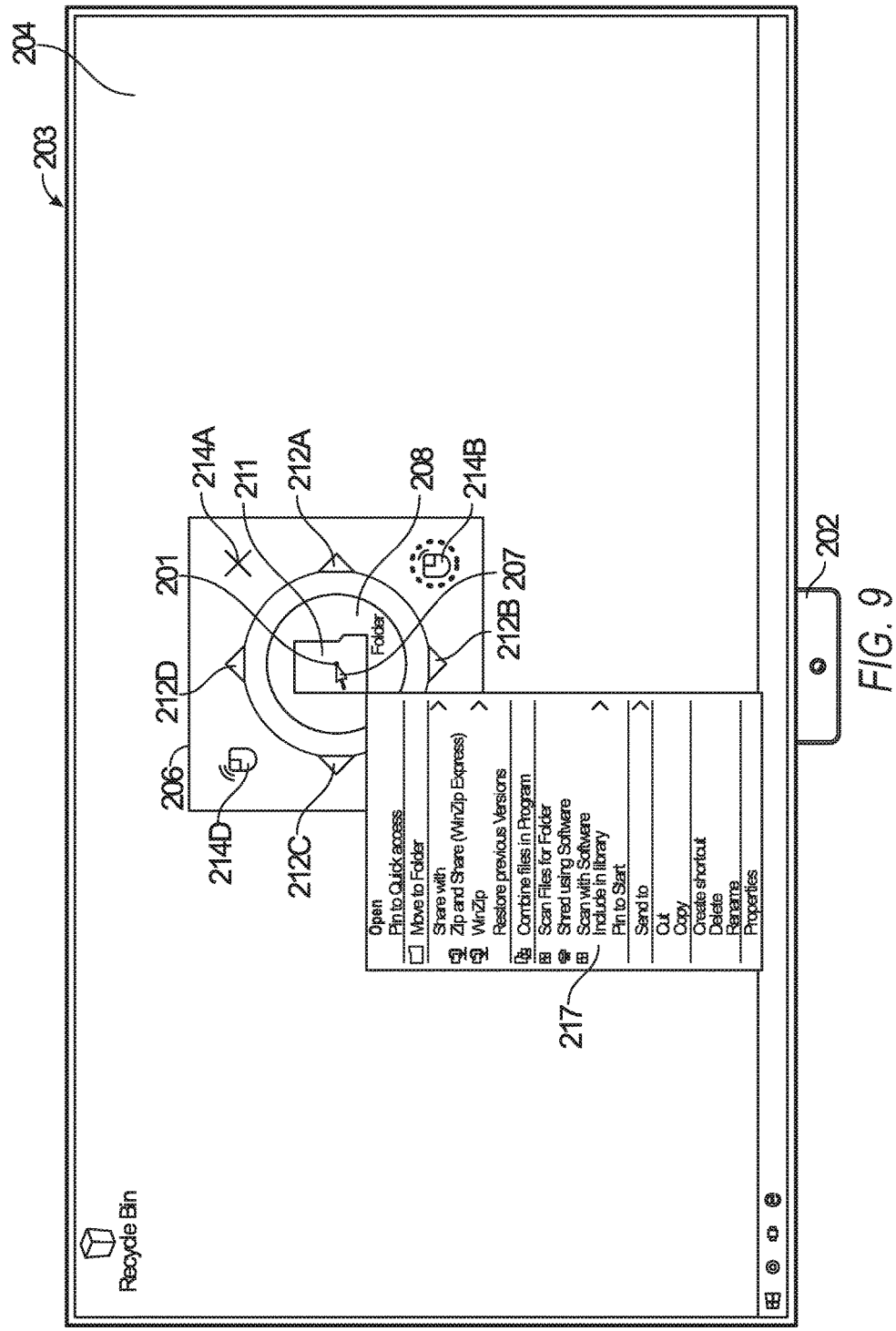
FIG. 9 shows the interface of FIG. 8 where an action item has been selected on the indirect indicator control window using eye gaze.

As shown in FIG. 9, the indirect indicator control window 206 may further include control objects 214A, 214B, 214C, 214D that when "selected" by the gaze G of the user U (e.g., by sufficient dwell time on at least one of the control objects 214A, 214B, 214C, 214D) perform actions relative to an item 211 (see FIGS. 4 and 6-10) that is engaged by the indicator 207. As an example, FIG. 9 shows the user interface 204 of FIG. 8 where an action item 214B (e.g., right click) has been selected on the indirect indicator control window 206 using eye gaze to display an example activity window 217.

In an example, the operating system 116 may show the cursor 207 in the area 208 of the indirect indicator control window 206 as a magnified area allows a User U via gaze interaction to more accurately adjust the position of the indicator 207 relative to the item 211 on the user interface 204.

As examples, the actions that may be performed relative to the item 211 that is engaged by the indicator 207 include at least one of a left click function, a right click function, a double click function or a drag-and-drop function. It should be noted that other "mouse click" actions are contemplated for operating the computing system 100, 200 (e.g., closing the indirect indicator control window 206 via gaze selection of control object 214A).

Figure 10:
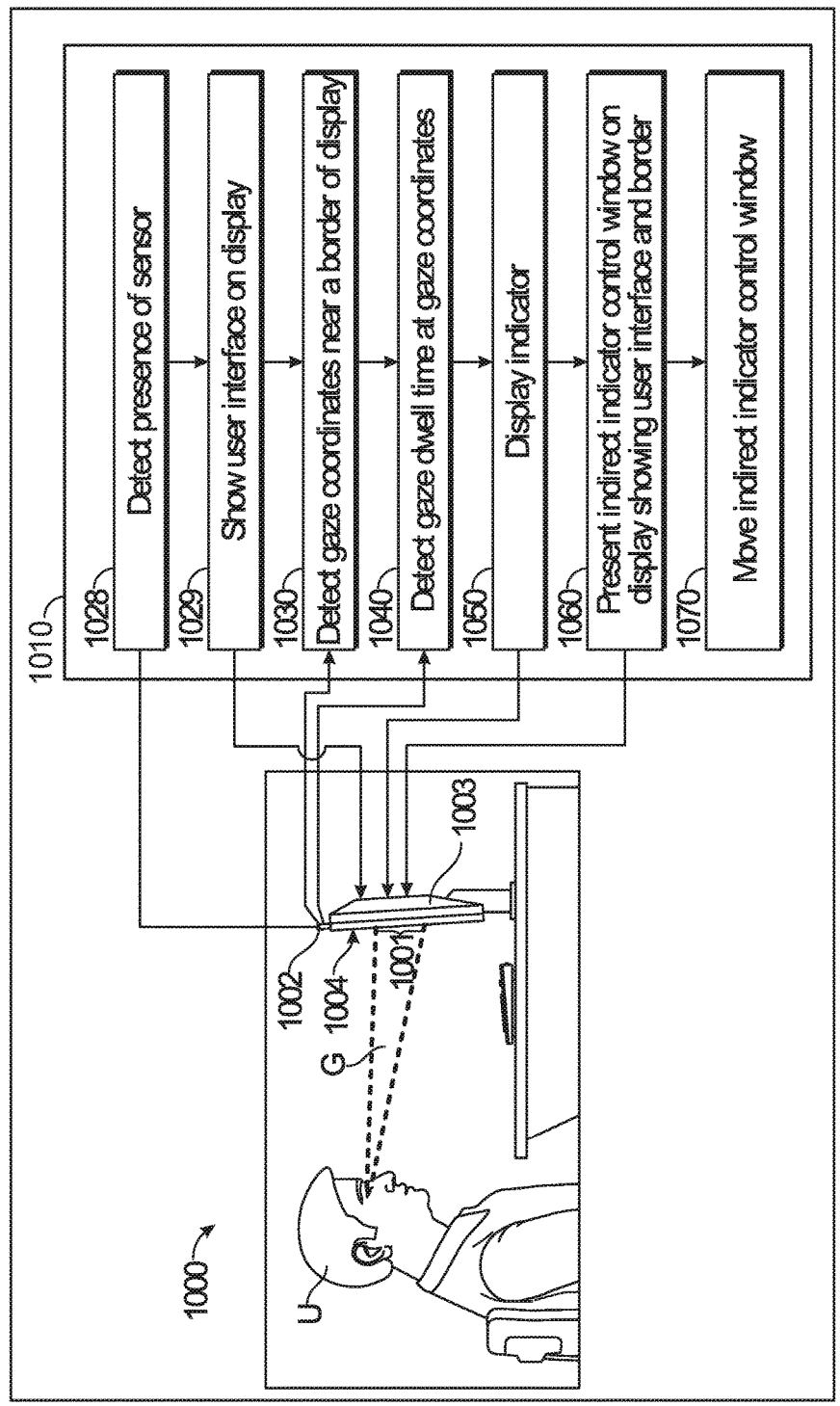
FIG. 10 shows a diagram of another computing system that performs operations according to examples of the present disclosure.

FIG. 10 shows a diagram of another example computing system 1010 that performs operations according to an example of the present disclosure. In an example, the components of FIG. 10 are similar to the example components of FIGS. 1 and 24. The computing system 1010 may include a processor (e.g., for example the processor 2402 shown in FIG. 24) and a memory (e.g., memory 2404 or 2406 in FIG. 24) that is communicatively coupled to the processor and may include instructions that when executed by the processor cause the computing system 1010 to perform the operations related to operating the computing system 1010.

Figure 11:
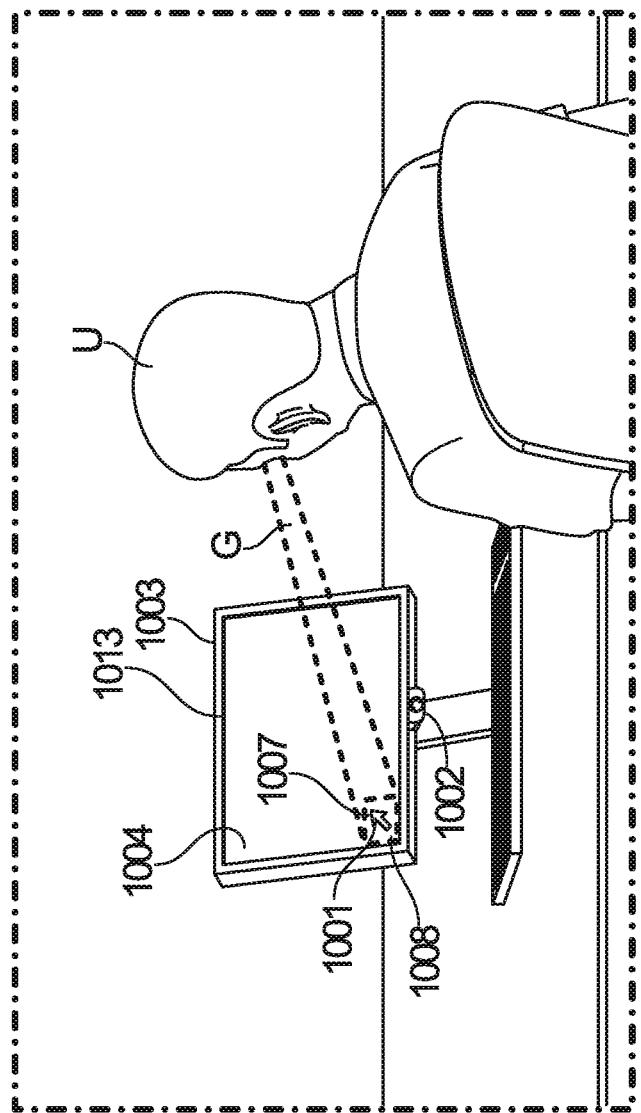
FIG. 11 illustrates a user controlling the computing system of FIG. 10 using gaze tracking.

As also shown in FIG. 11, the computing system 1010 includes a display 1003 and a sensor 1002 that detects a gaze G of a user U at a user interface 1004 on the display 1003. The computing system 100, 1000 [1030] detects gaze coordinates 1001 of the user's U gaze G.

Figure 12:
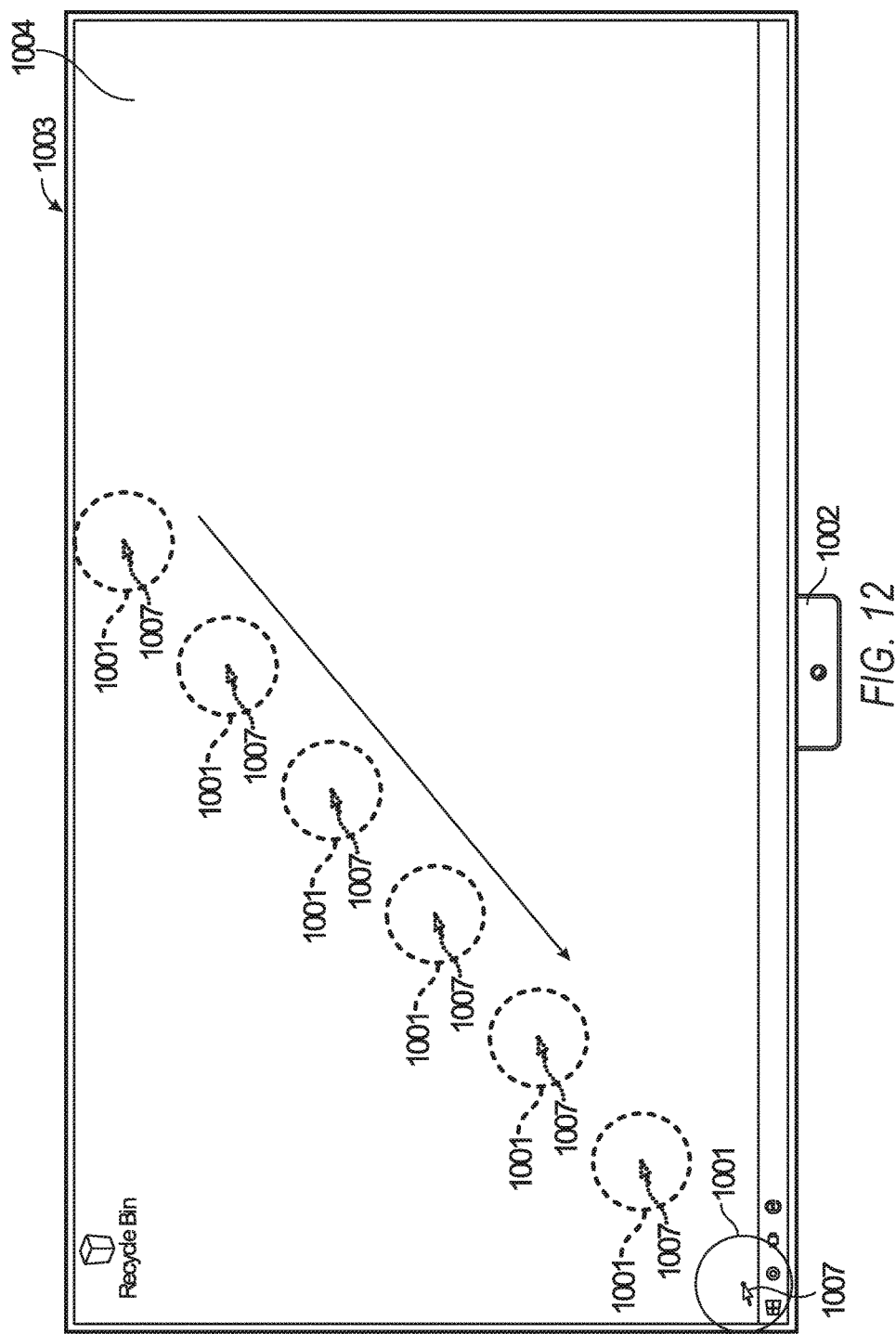
FIG. 12 shows the user interface of FIG. 11 where a computing system is performing gaze tracking into the corner of the user interface.

As shown in FIG. 12, the gaze coordinates 1001 move as the user's U gaze G moves on the user interface 1004. The sensor 1002 may exchange input and output 118 with the computing system 1010 (e.g., processor 2402) in order to detect [1040] the user's U gaze G within a threshold distance of the gaze coordinates 1001 for at least a predetermined period of time (e.g., dwell time). The computing system 1010 may show an appropriate user interface 1004 when the user's U gaze G meets (or exceeds) the predetermined time. As shown in FIGS. 13-16, the operating system 116 of the computing system 100, 1000 displays [1050] an indicator 1007 as an object within the user interface 1004 at the gaze coordinates 1001 once the user's U gaze G occurs for at least the predetermined time period at the gaze coordinates 1001; and presents [1060] an indirect indicator control window 1006 on the user interface 1004.

The indirect indicator control window 1006 includes an at least partially transparent section to allow a user U to see an area 1008 of the user interface 1004 at the gaze coordinates 1001. The indirect indicator control window 1006 on the user interface 1004 includes an at least partially transparent section that displays an area of the user interface 1004 based on the gaze coordinates. The section of the indirect indicator control window 1006 shows a portion of the user interface 1004 near the border 1013 and a representation of at least a portion of the border 1013 of the display 1004.

In the illustrated example forms shown in FIGS. 13-16, the portion of the border 1013 includes a corner 1015 of the border 1013. In other forms, the portion of the border 1013 additionally, or alternatively, includes an edge 1016 of the border 1013.

It should be noted that in this example form, a gaze indicator similar to gaze indicator 209 described above may be used to provide the user U with feedback as to Where they are gazing on the user interface 1004. The longer the user U holds their gaze steady (or dwells) on a particular location (e.g., gaze coordinates 1001), the smaller the dwell state indicator gets until it eventually triggers (see, e.g., FIG. 5) the indirect indicator control window 1006.

In an example, the representation of the border 1013 is presented differently the indirect indicator control window 1006 than the user interface 1004 in order to help distinguish the border 1013 from the user interface 1004. As shown in FIGS. 13-16, the indirect indicator control window 1006 is not transparent and copies contents of the user interface 2004 below the indirect indicator control window 1006 and renders an image of the user interface 204 and a border of the user interface 1004. In an example, the representation of the border 1013 may be shown more opaque and the user interface 1004 may be shown more transparent.

The indirect indicator control window 1006 can only get so close to the edges 1116 and corners 1115 of the display 1003 without running over the border 1013 and clipping some of the indirect indicator control window 1006 functionality. The computing system 1010 described herein does not allow any portions of the indirect indicator control window 1006 to leave the screen boundaries of the user interface 1004.

The indirect indicator control window 1006 stops when it gets to the border 1013 (e.g., an edge 1016 and/or a corner 1015) and then begins to change the contents of the displayed area 1008 as the user navigates closer to the edges 1016 or corners 1015. When the displayed area 1008 of the indirect indicator control window 1006 is offset for this purpose, a representation of the border 1013 appears to indicate to the user the position that the magnified and displayed area 1008 is currently displaying (e.g., a corner 1016 and/or at least one edge 1015). The indicator 1007 updates its location when the user navigates to engage the cursor 1007 with the item 1011 (e.g., by using control objects 1012A, 1012B, 1012C, 1012D). The indirect indicator control window 1006 only moves when the user navigates enough in the offset direction to eliminate the vertical or horizontal offset such that the location at the center of the displayed area 1008 once again represents the same location that is physically under the displayed area 1008 (e.g., moves indirect indicator control window 1006 in the associated direction such that the horizontal and/or vertical offset is zero).

Similar to the examples described above relative to FIGS. 6-9, the indirect indicator control window 1006 may include control objects 1012A, 1012B, 1012C, 1012D that once selected (e.g., by dwelling for at least a period of time) by the gaze G of the user U moves the indirect indicator control window 1006 on the user interface 1004. It should be noted that although the indicator 1007 is illustrated in the FIGS. as a pointer or cursor, the indicator 1007 may take other forms.

The computing system 1010 may perform operations before the sensor 1002 is used to observe a gaze G of a user U at the user interface 1004. As an example, one or more portions of the computing system 1010 (e.g., eye tracking 112 or gate detection processing 114) may perform operations such as [1028] detecting the presence of the sensor 1002 that observes the gaze G of the user U.

Figure 13:
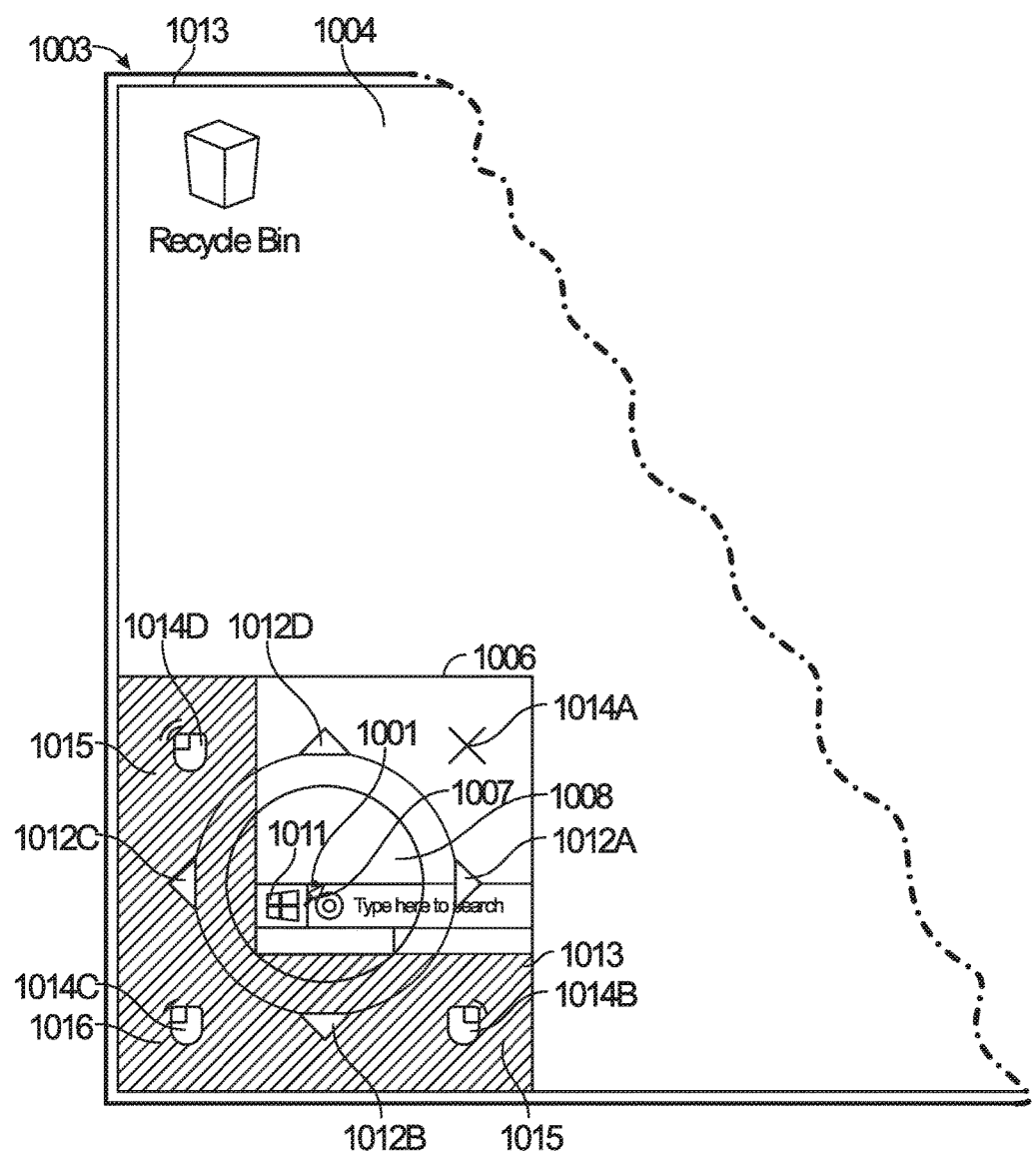
FIG. 13 shows the user interface of FIG. 12 where the user's gaze has exceeded the dwell time in a corner of the user interface in order to display an indirect indicator control window.
Figure 14:
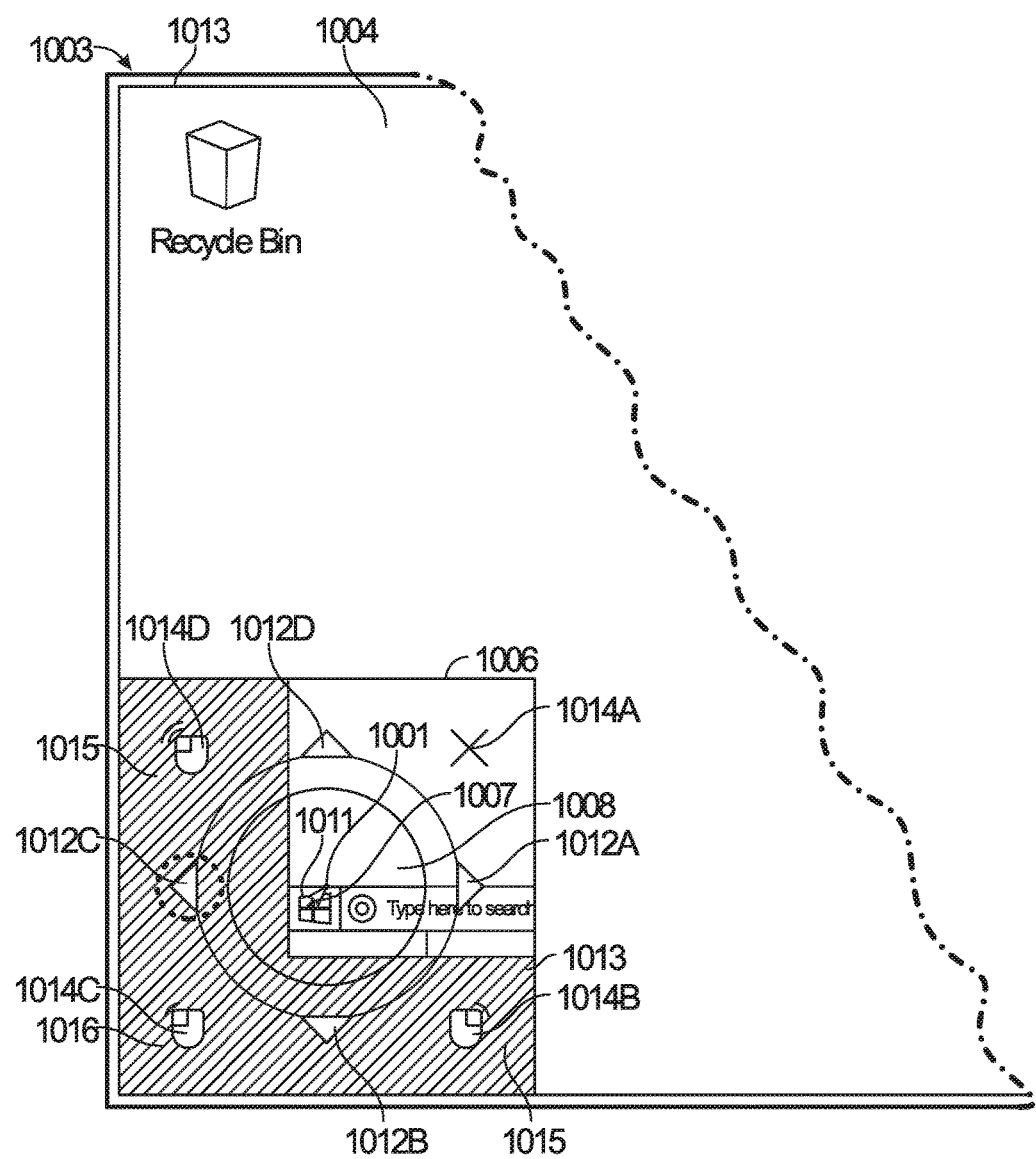
FIG. 14 illustrates the user interface of FIG. 13 where the indirect indicator control window has been maneuvered horizontally.
Figure 15:
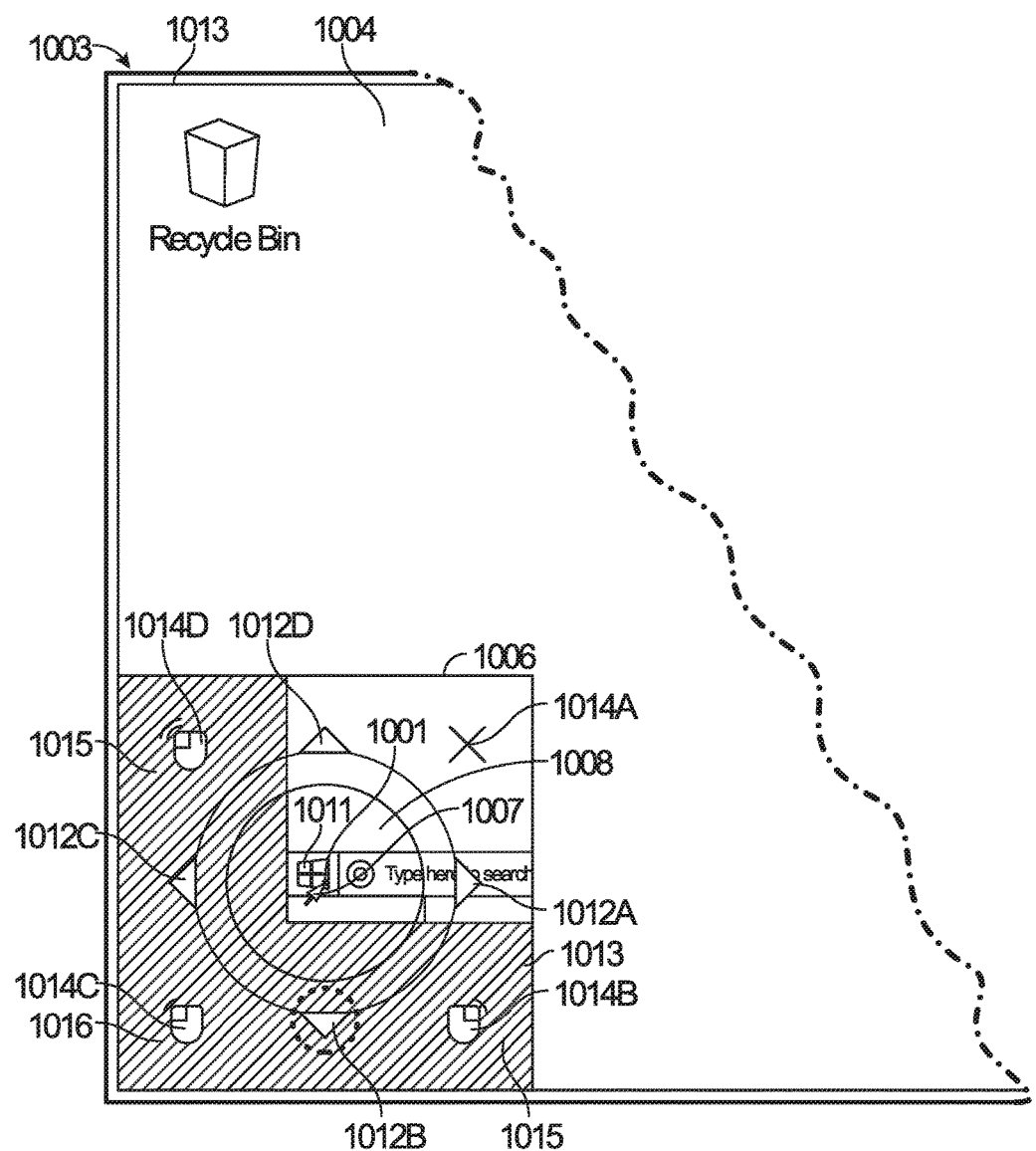
FIG. 15 shows the user interface of FIG. 14 where the indirect indicated control window has been moved vertically in order to align an item relative to a cursor.

In addition, the computing system 1010 (e.g., the operating system 116) may [1029] show the user interface 1004 on the display 1003 such that the user interface 1004 includes at least one control object 1012A, 1012B, 1012C, 1012D that supports gaze interaction with the user interface 1004 when the control object 1012A, 1012B, 1012C, 1012D is activated by the user's U gaze G. As shown in FIGS. 13-15, in various forms, the control objects 1012A, 1012B, 1012C, 1012D are navigation buttons that are shown located around the displayed area 1008.

FIG. 13 illustrates an example indirect indicator control window 1006 that is shown on a user interface 1004 when a user's U gaze G exceeds the threshold period of time at particular gaze coordinates 1001. FIG. 14 illustrates the user interface 1004 of FIG. 13 where the indirect indicator control window 1006 has been maneuvered horizontally by selecting control object 1012C. FIG. 15 shows the user interface 1004 of FIG. 14 where the indirect indicator control window 1006 has been moved vertically by selecting control object 1012B in order to align the item 1011 on the user interface 1004 relative to the cursor 1007. The control objects 1012A, 1012B, 1012C, 1012D provide the user a way to use gaze with dwell to navigate in four different directions (e.g., up U, down D, left L, right R) as the selected control object quickly but gradually moves the indirect indicator control window 1006 to a desired location on the user interface 1004. It should be noted that as discussed above, other forms are contemplated where the indirect indicator control window 1006 is also initiated on the user interface 1004 (e.g., by the operating system 116) by directly gazing at an associated button (not shown) on the user interface 1004 and then immediately gazing in the vicinity of the desired item 1011 which is where the indirect indicator control window 1006 will appear to assist the user U in completing gaze interaction.

Figure 16:
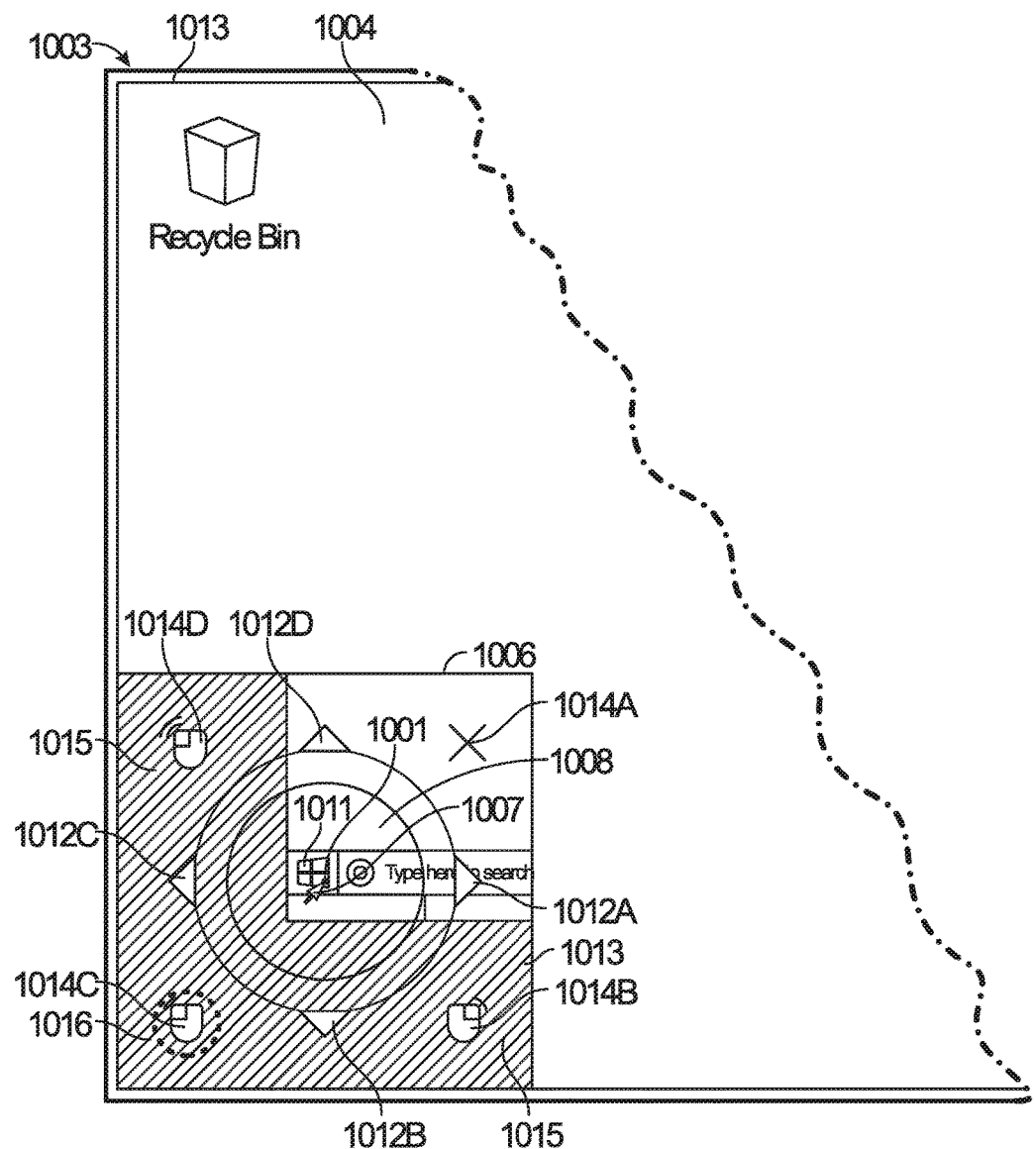
FIG. 16 shows the interface of FIG. 15 where an action item has been selected on the indirect indicator control window by the gaze of a user.
Figure 17:
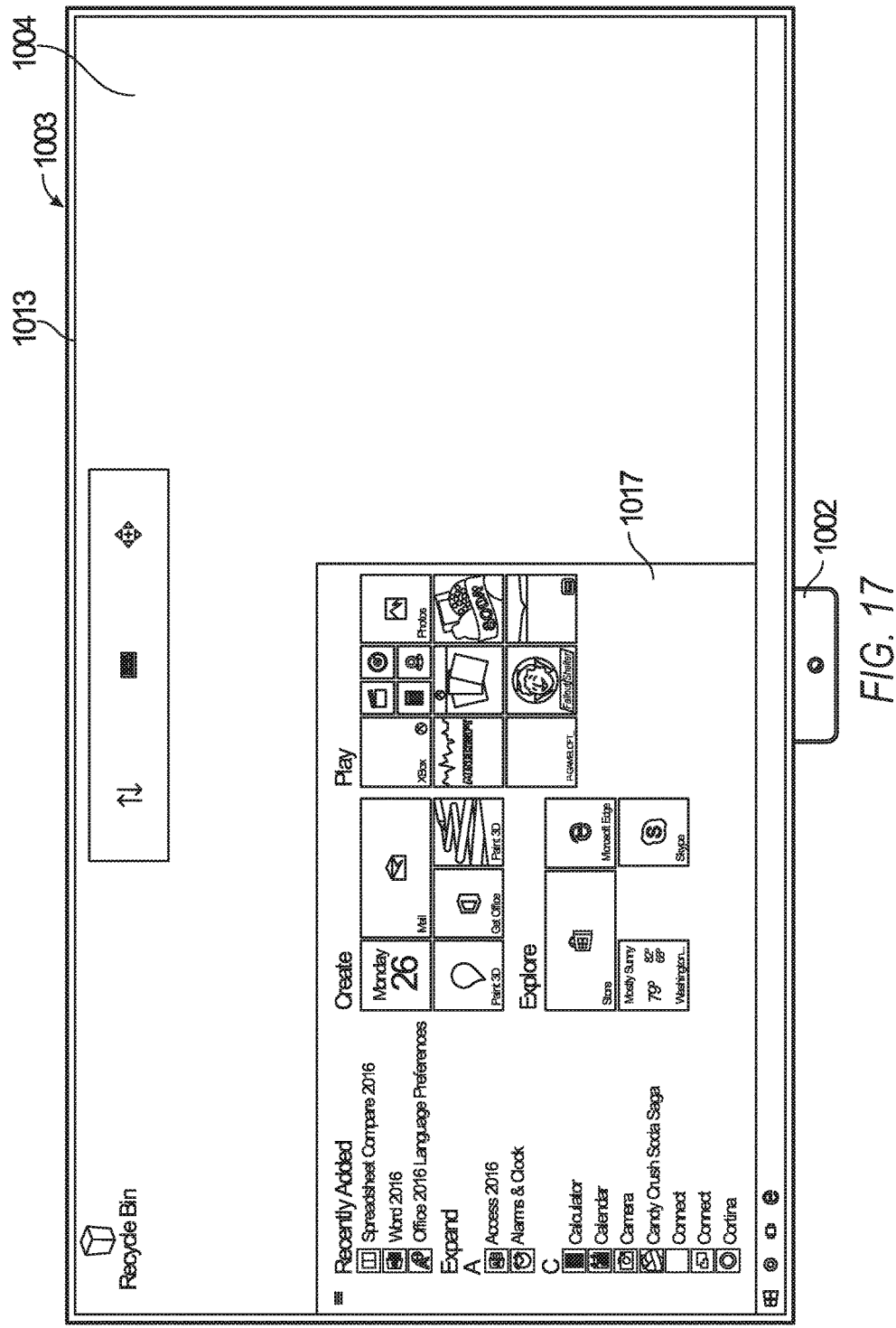
FIG. 17 shows the user interface of FIG. 16 after the user's gaze selects the control object thereby modifying the user interface.

As shown most clearly in FIGS. 16 and 17, the indirect indicator control window 1006 may further include control objects 1014A, 1014B, 1014C, 1014D that, in response to being selected by the gaze G of the user U, (e.g., by gazing for a sufficient dwell lime) perform actions relative to an item 1011 that is engaged by the indicator 1007. As an example, FIGS. 16 and 17 show the user interface 1004 of FIGS. 13-15 where an action item 1014D (e.g., left click) has been selected on the indirect indicator control window 1006 using eye gaze. In the illustrated example shown in FIG. 17, the "left click" action opens an application manager item 1011 that is present in the corner of the user interface 1004 to display an object window 1017.

Other example actions that may be performed relative to the item 1011 that is engaged by the indicator 1007 include at least one of a left click function 1014C, a right click function 1014B, a double click function 1014D, a drag-and-drop function and/or a close indirect indicator control window 1006 function 1014A. Other example action buttons include buttons that open a keyboard, placing a cursor into any valid input field (among other computer operating actions) In an example, the indirect indicator control window 1006 may automatically disappear when any of the control object 1014A, 1014B, 10140, 1014D (or other example action buttons) are triggered by a user's U gaze interaction. In addition, as shown in FIGS. 13-16, the indirect indicator control window 1006 may include a control object 1014A that serves to close the indirect indicator control window 1006 when control object 1014A is selected by the user U using gaze interaction.

Figure 18:
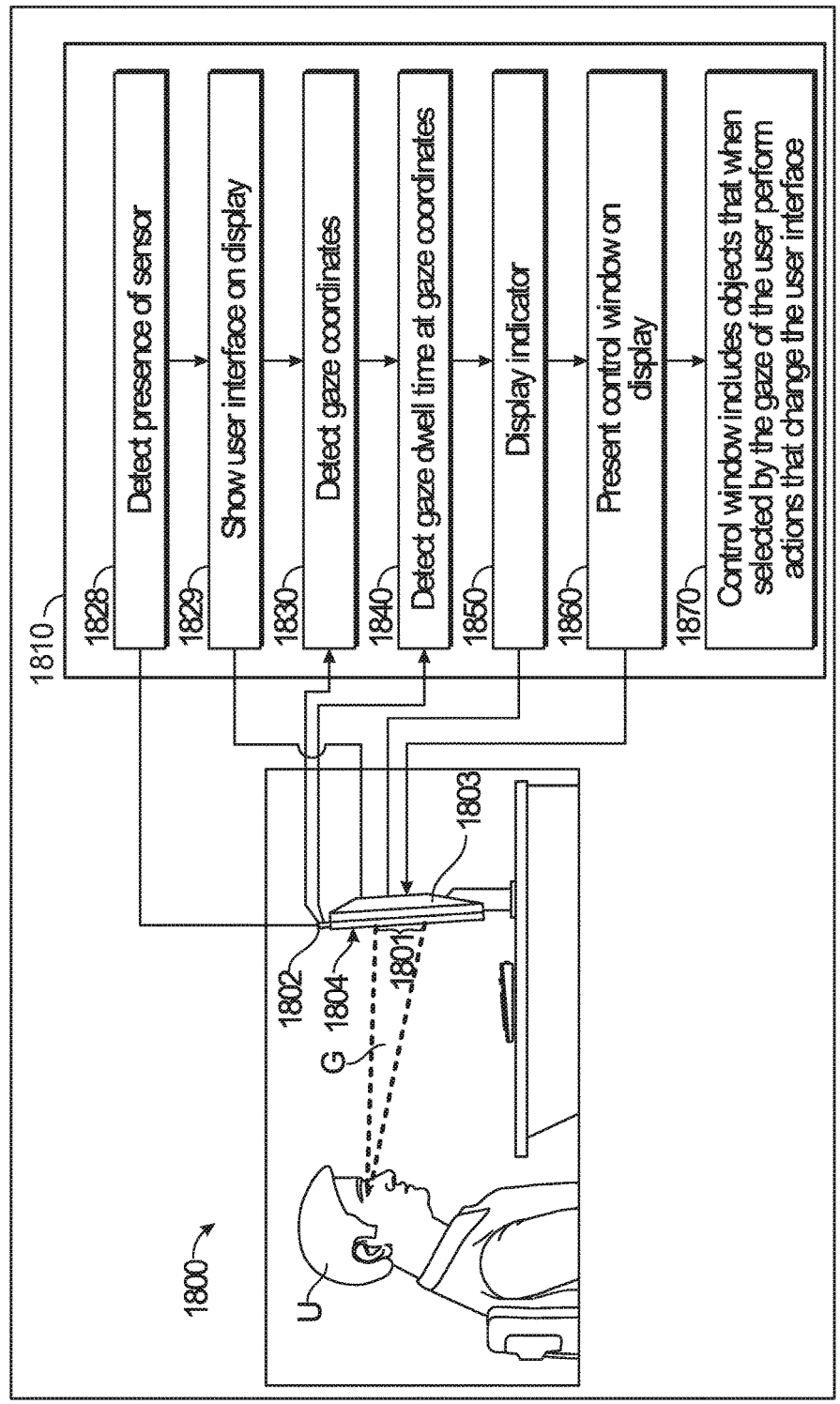
FIG. 18 shows a diagram of another computing system that performs operations according to examples of the present disclosure.

In an example, the components of FIG. 18 are similar to the example components of FIGS. 1, 10 and 24. The computing system 1810 shown in FIGS. 18-20 may include a processor (e.g., for example the processor 2402 shown in FIG. 24) and a memory (e.g., memory 2404 or 2406 in FIG. 24) that is communicatively coupled to the processor and may include instructions that when executed by the processor cause the computing system 1810 to perform operations related to operating the computing system 1810.

Figure 19:
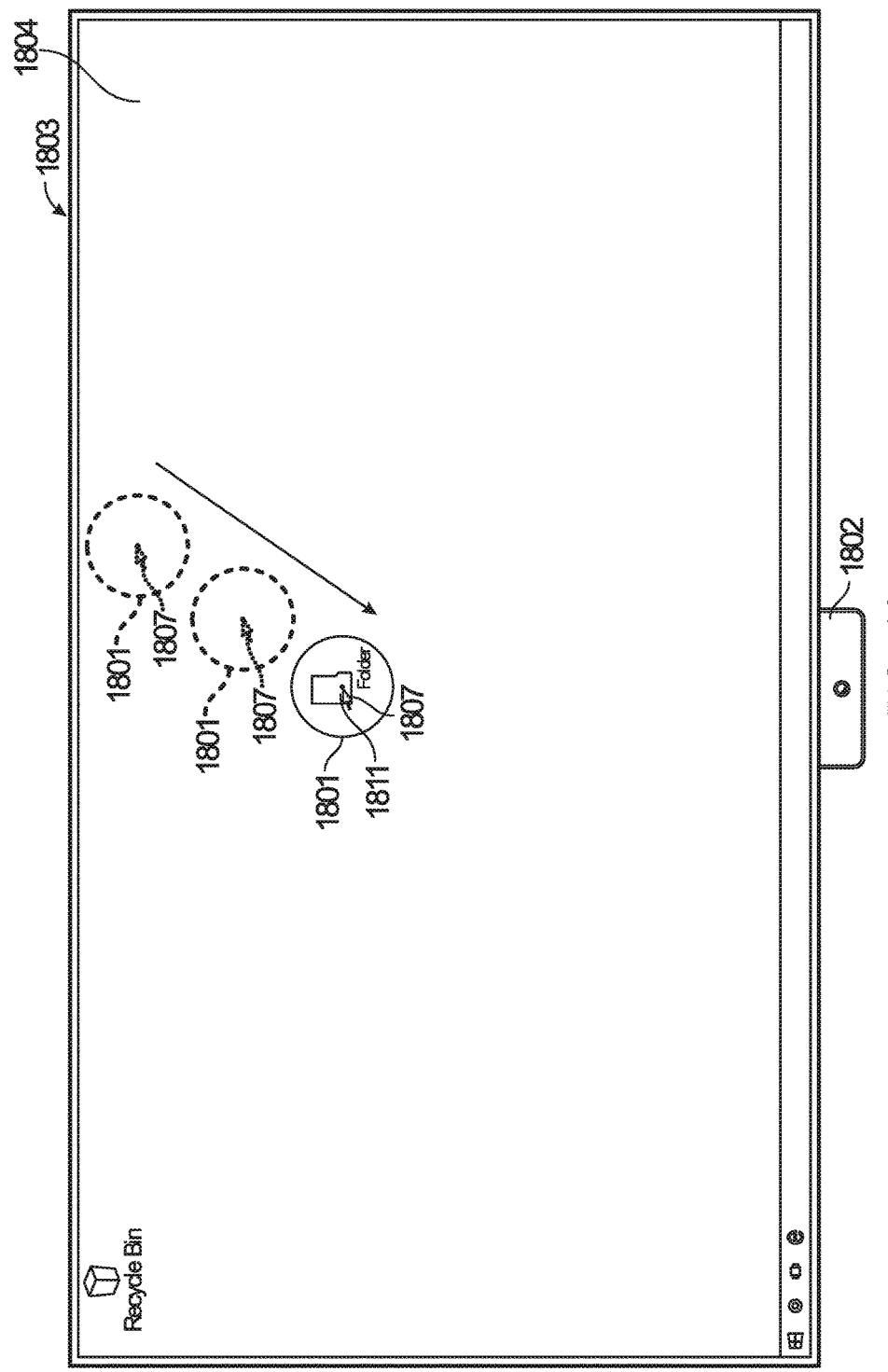
FIG. 19 illustrates the computing system of FIG. 18 where gaze tracking is used to place a cursor near an item.

As shown in FIG. 19, the gaze coordinates 1801 move as the user's U gaze G moves on the user interface 1804. A sensor 1802 may exchange input and output 118 with the computing system 100, 1800 (e.g., processor 2402) in order to [1830] detect gaze coordinates 1801 of a user's U gaze G; and [1840] detect the user's U gaze G within a threshold distance of the gaze coordinates 1801 for at least at least a predetermined period of time (e.g., dwell time).

Figure 20:
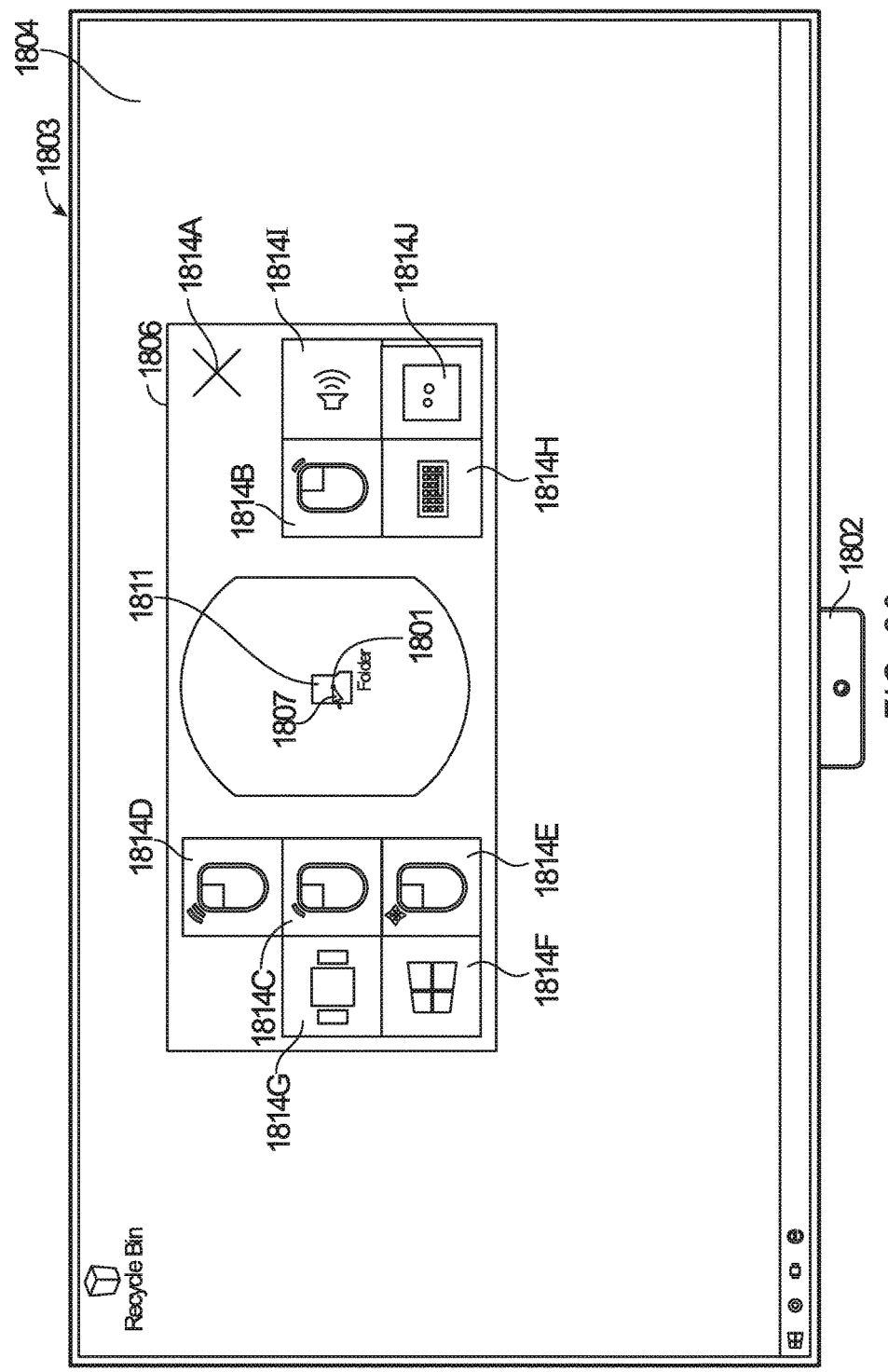
FIG. 20 shows the user interface of FIG. 19 after the user's gaze has exceeded a dwell time at a location in order to bring up an indicator control window.

As shown in FIG. 20, the operating system 116 of the computing system 100, 1800 displays [1850] an indicator 1807 as an object within the user interface 1804 at the gaze coordinates 1801 once the user's U gaze G occurs for at least the predetermined time period at the gaze coordinates 1801; and presents [260] a control window 1806 on the user interface 1804. The control window 1806 includes control objects 1814A, 1814B, 1814C, 1814D, 1814E, 1814F, 1814G, 1814H, 1814I, 1814J that, in response to being selected by the gaze G of the user U, perform actions that change the user interface 1804.

In an example, the control window 1006 includes control objects 1814A, 1814B, 1814C, 1814D, 1814E, 1814F, 1814G, 1814H, 1814I, 1814J that, in response to being selected by the gaze G of the user U, perform actions relative to an item 1811 that is engaged by the indicator 1807 on the user interface 1804.

As shown in FIG. 20, the indirect indicator control window 1806 includes control objects 1814A, 1814B, 1814C, 1814D that when "selected" by the gaze G of the user U (e.g., by sufficient dwell time on at least one of the control objects 1814A, 1814B, 1814C, 1814D) perform actions relative to an item 1811 that is engaged by the indicator 1807. As examples, the actions that may be performed relative to the item 1811 that is engaged by the indicator 1807 include at least one of a left click function 18140, a right click function 1814B, a double click function 1814D, a drag-and-drop function 1814E.

It should be noted that other "mouse click" actions are contemplated for operating the computing system 100, 200. As an example, the control window 1806 may include a control window 1806 closing function 1814A. As another example, the control window 1806 may include an application manager opening function 1814F and/or an application switching function 1814G. As another example, the control window 1806 may include a keyboard graphic opening function 1814H and/or a volume adjustment for the computer 1800 function 1814I.

It should be noted that any number and variety of other computer related operations are contemplated for, and may for example be performed by gaze selection of control object(s) 1814J. In addition, the number, type, location, arrangement and size of the control objects will depend in part on the technical effects that need to be achieved when controlling the computing system 1810 using the systems and methods described herein. As another example, the control window 1806 (and any of the indirect indicator control windows described herein) may include a (i) gaze calibration function that is activated by a control object; (ii) scrolling function; (iii) context switching (e.g., mouse to keyboard input mode switching); and/or magnification of one or more portions of the user interface.

Placing the control objects in close proximity with the gaze coordinates may (i) reduce the dependence of gaze tracking systems on accurate gaze tracking; (ii) minimize gaze targeting issues that are associated with factors like small target sizes, and areas of the screen (like edges and corners) that can be very difficult to reach due to hardware or user ability limitations; (iii) make the gaze-related experience more accurate and more comfortable; (iv) reduce consumption of computational resources; and/or reduce fatigue (physical and cognitive load) for a user.

In an example, the operating system 116 of the computing system 1810 may use a gaze indicator similar to the example gaze indicator 209 described above relative to FIG. 5. The gaze indicator may be used to provide the user with feedback as to where the user U is gazing G on the user interface 1804. The user U holds their gaze steady (or dwells) on a particular location until eventually one of the systems (e.g., the operating system 116) triggers the control window 1806. In an example, the computing system 1810 may perform operations before the sensor 1802 is used to observe a gaze G of a user U at the user interface 1804. As an example, one or more portions of the computing system 1810 may perform operations such as [1828] detecting the presence of the sensor 1802 that observes the gaze G of the user U. In addition, the computing system 1810 (e.g., the operating system 116) may show [1829] the user interface 1804 on the display 1803 such that the user interface 1804 includes at least one item 1811 that supports gaze interaction with the user interface 1804 when a control object 1814A, 1814B, 1814C, 1814D, 1814E, 1814F, 1814G, 1814H, 1814I, 1814J is activated by the user's U gaze G.

In an example, the control window 1806 may be an indirect indicator control window 1806, and the control objects may include direction buttons that move the indicator 207 indirect indicator control window on the user interface 1804 when selected by the gaze G of the user U. FIGS. 6-8 and 13-16 show examples of such a displayed area as well as control objects that include direction buttons to maneuver the cursor 1807. When the computing system 1810 includes a displayed area in an indirect indicator control window, a representation of a border may appear to indicate to the user the position (e.g., an edge or corner position of the user interface 1804) that indirect indicator control window 1806 is currently displaying (see, e.g., FIGS. 13-16).

It should be noted that other forms are contemplated where control window 1806 is also initiated on the user interface (e.g., by the operating system 116) by directly gazing at an associated button on the user interface 1804 and then immediately gazing in the vicinity of an item 1811 on the user interface or an area of the user interface, which is where the control window 1806 will appear to assist the user in completing the gaze interaction.

Figure 21:
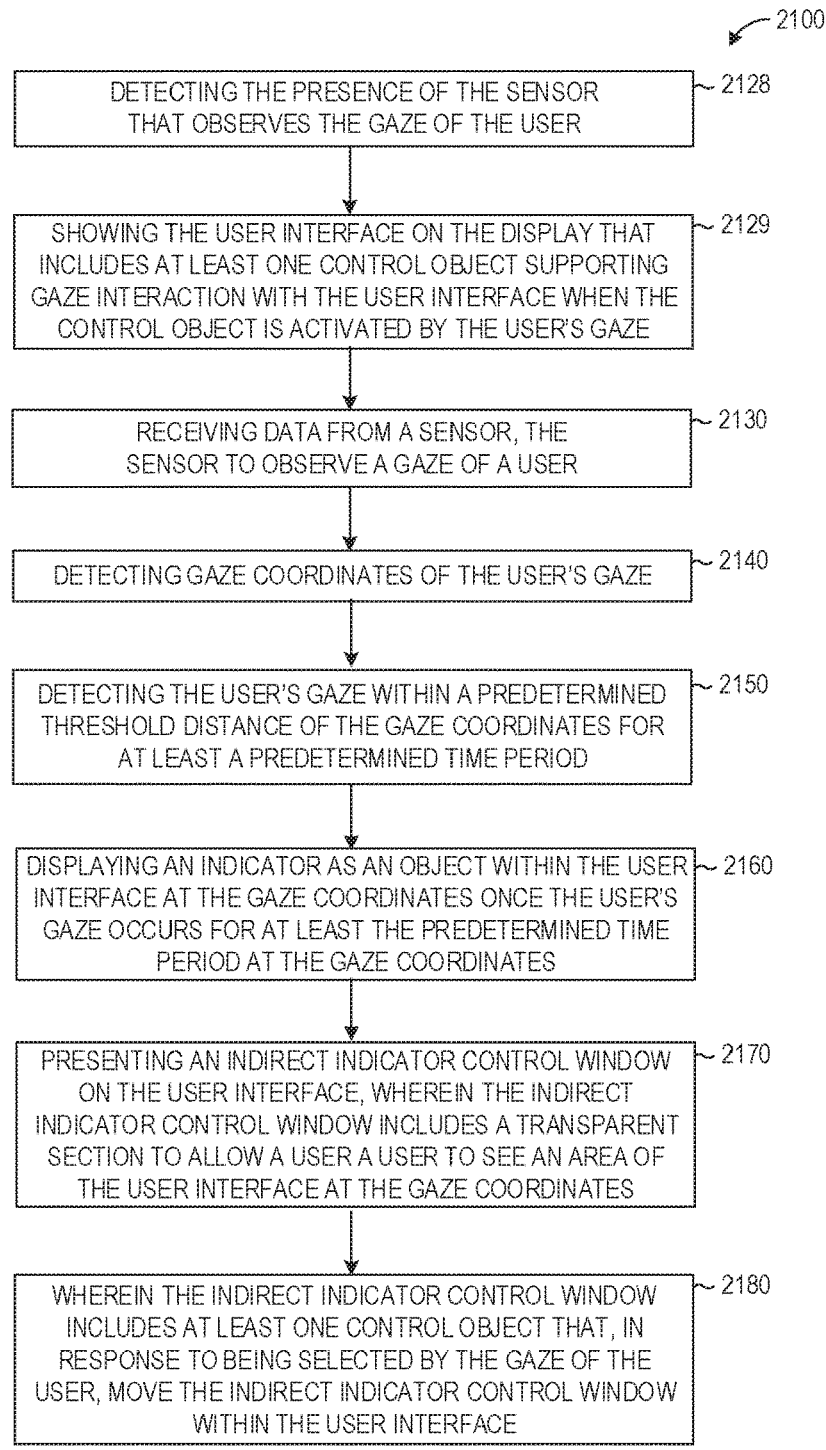
FIG. 21 shows a flowchart of a method of operating a computing system using gaze detection according to examples of the present disclosure.

Turning now to FIG. 21 a flowchart of a method 2100 of controlling an indicator on a computer using eye gaze and dwell is shown and described according to examples of the present disclosure. The method 2100 will also be described herein with reference to FIGS. 2-9.

The method 2100 includes [2130] receiving data from a sensor 202 where the sensor observes a gaze G of a user U, and [2140] detecting gaze coordinates 201 of the user's U gaze G. The user's U gaze G is [2150] detected within a predetermined threshold distance of the gaze coordinates 201 for at least a predetermined time period.

The method 2100 further includes [2160] displaying an indicator 207 as an object within the user interface 204 at the gaze coordinates 201 once the user's U gaze G occurs for at least the predetermined time period at the gaze coordinates 201; and [2170] presenting an indirect indicator control window 1006 on the user interface 1004 where the indirect indicator control window 1006 includes a transparent section to allow a user a user U to see an area 208 of the user interface 204 at the gaze coordinates 201. As also shown in FIGS. 14-16, the indirect indictor control window [2180] includes control objects 202A, 202B, 202C, 202D that, in response to being selected by the gaze G of the user U, move the indirect indicator control window 206 within the user interface 204. In an example, the method 2100 further includes [2128] detecting the presence of the sensor 202 that observes the gaze G of the user U. In addition, the method may further include [2129] showing the user interface 204 (e.g., by using the operating system 116) on the display 203 that includes at least one control object 202A, 202B, 202C, 202D, 204A, 20413, 2040, 204D that is supported in gaze interaction with the user interface 204. It should be noted that operations [2128] and [2129] may be performed at the beginning of the method 2100.

It should be noted that forms of the method 2100 are contemplated where the method 2100 includes using an indirect indicator control window 206 that includes control objects 202A, 202B, 202C, 202D that, in response to being selected by the gaze G of the user U, perform actions relative to an item 211 that is engaged by the indicator 207 in the section of the indirect indicator control window 206 that displays the area 208 on the user interface 204.

Figure 22:
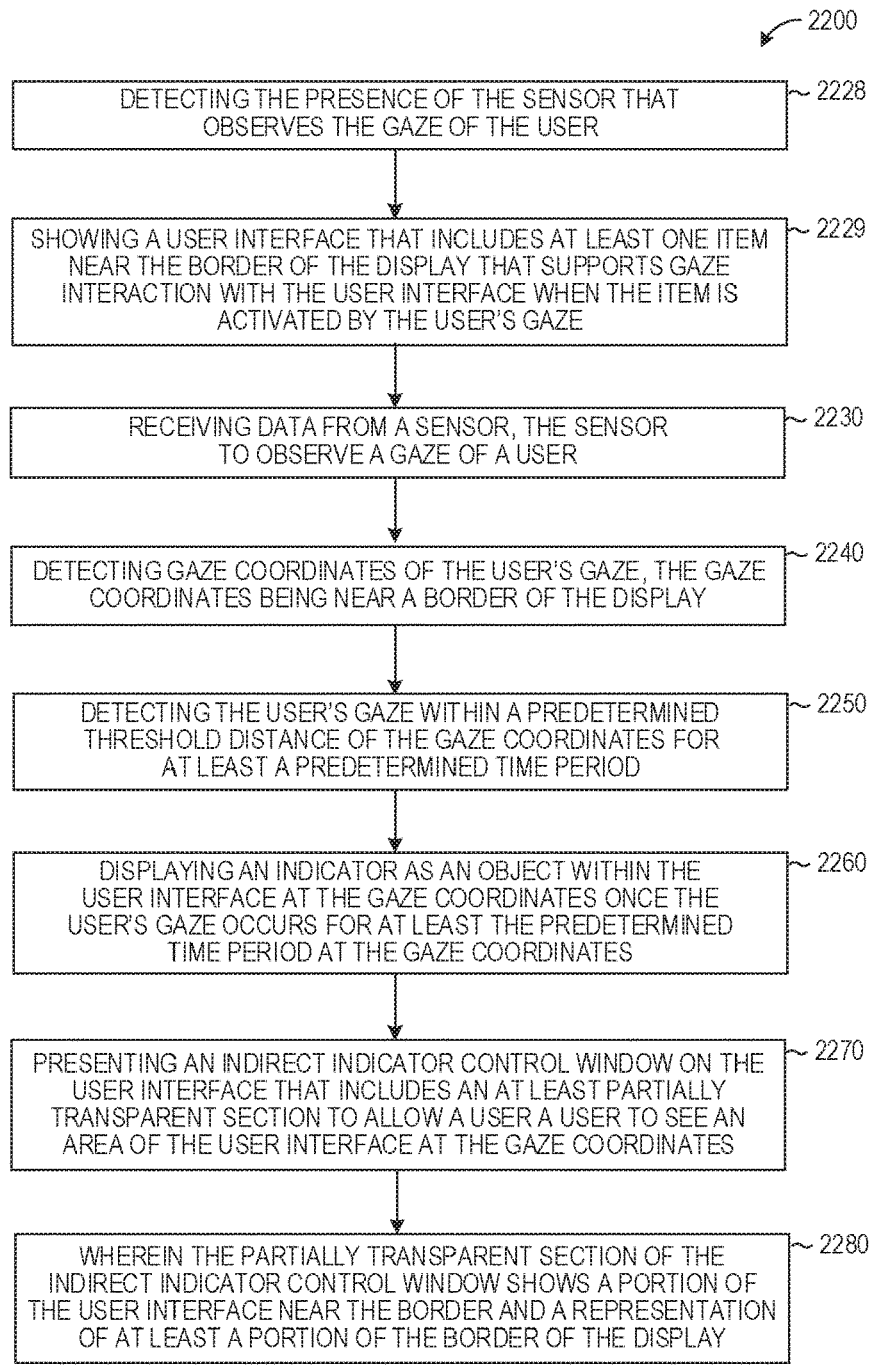
FIG. 22 shows a flowchart of another method of operating a computing system using gaze detection according to examples of the present disclosure.

Turning now to FIG. 22, a flowchart of a method 2200 of controlling an indicator on a computer system 100, 1000, 2400 using eye gaze and dwell is shown according to examples of the present disclosure. The method 2200 will also be described with regard to FIGS. 10-17.

The method 2200 includes [2230] using a sensor 1002 to observe a gaze G of a user U at a user interface 1004 on a display 1003, and [2240] detecting gaze coordinates 1001 of the user's U gaze G. The gaze coordinates 1001 are near a border 1013 of the display 1003.

At operation [2250], the method 2100 further includes detecting the user's U gaze G within a predetermined threshold distance of the gaze coordinates 1001 for at least a predetermined time period. At operation [2260], the method 2200 further includes [2260] displaying an indicator 1007 as an object within the user interface 1004 at the gaze coordinates 1001 once the user's U gaze G occurs for at least the predetermined time period at the gaze coordinates 1001.

The method 2200 further includes [2270] presenting an indirect indicator control window 1006 on the user interface 1004 that includes an at least partially transparent section to allow a user U to see an area 1008 of the user interface 1004 at the gaze coordinates 1001 (see FIGS. 13-16). At operation [2280], the magnified and displayed area 208 of the indirect indicator control window 1006 shows a portion of the user interface 1004 near the border 1013 of the display 1003 and a representation of at least a portion of the border 1013 of the display 1003.

As shown most clearly in FIGS. 10, 11 and 22, the method 2200 may further include [2228] detecting the presence of the sensor 1002 that observes the gaze G of the user U; and [2229] showing a user interface 1004 that includes at least one item 1011 near the border 1013 of the display 1003 that supports gaze interaction with the user interface 1004 when the item 1011 is activated by the user's U gaze G (e. g., by using operating system 116). It should be noted that operations [2228] and [2229] may be performed at the beginning of the method 2100.

A shown in FIGS. 14-16, the representation of the border 1013 is presented differently in the magnified and displayed area 1008 than the user interface 1004 in order to help distinguish the border 1013 from the user interface 1004. As an example, the representation of the border 1013 may be shown more opaque and the user interface 1004 may be rendered as an image of the portion of the user interface 1004 that is under the indirect indicator control window 1006.

It should be noted that forms of the method 2200 are contemplated where the portion of the border 1013 includes at least one of an edge 1016 of the border 1013 and a corner 1015 of the border. The example form shown in FIGS. 13-16 shows two edges 1016 of the border 1013 connected to a corner of the border 1013 (e.g., the lower left corner of the border 1013).

Figure 23:
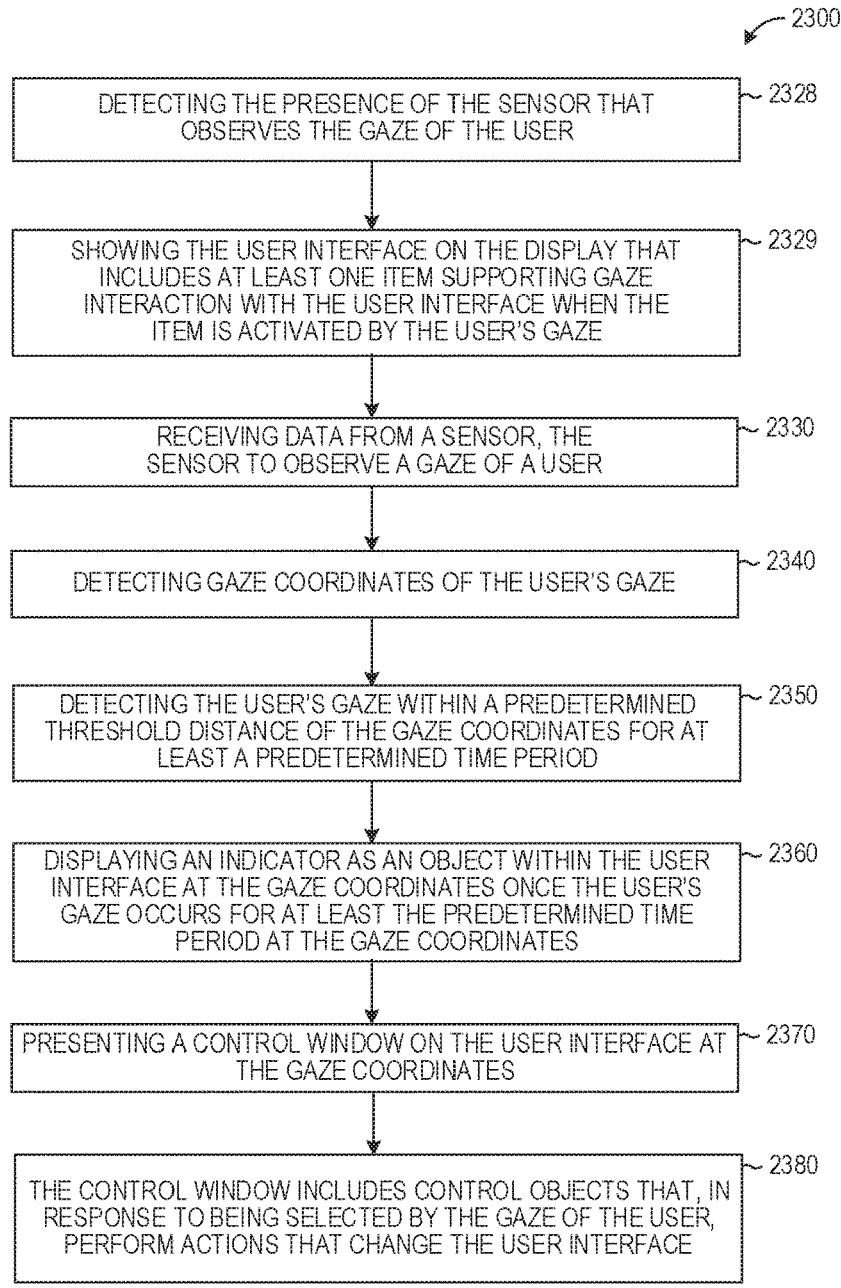
FIG. 23 shows a flowchart of still another method of operating a computing system using gaze detection according to examples of the present disclosure.

Turning now to FIG. 23 a flowchart of a method 2300 of controlling an indicator on a computer system 1800 using eye gaze and dwell is shown according to examples of the present disclosure. The method 2300 will also be described with reference to FIGS. 18-20.

The method 2300 includes [2330] receiving data from a sensor 1802 where the sensor observes a gaze G of a user U, and detecting gaze coordinates 1801 of the user's U gaze G (see, e.g., FIG. 18). At operation [2340], the method 2300 includes detecting the user's U gaze G within a predetermined threshold distance of the gaze coordinates 1801 for at least a predetermined time period (e.g., dwell time).

The method 2300 further includes [2350] displaying an indicator 1807 as an object within the user interface 1804 at the gaze coordinates 1801 once the user's U gaze G occurs for at least the predetermined time period at the gaze coordinates 1801. As shown in FIG. 19, the gaze coordinates 1801 move as the user's U gaze G moves on the user interface 1804. The sensor 1802 may exchange input and output 118 with the computing system 1810 (e.g., processor 2402) in order to detect the user's U gaze G.

The method 2300 may also utilize a gaze indicator similar to gaze indicator 209 described above in order to provide the user with feedback as to where the user U is gazing on the user interface 1804. The longer the user U holds their gaze steady (or dwells) on a particular location (e.g., gaze coordinates 1801), the smaller the dwell state indicator gets (see, e.g., FIG. 5) eventually triggers a control window 1806.

At operation [2360], the method 2300 includes presenting a control window 1806 on the user interface 1804 that includes an area 1808 of the user interface 1804 based on the gaze coordinates 1801 (see, e.g., FIG. 20). At operation [2380], the method 2300 includes where the control window 1806 includes control objects 1814A, 1814B, 1814C, 1814D, 1814E, 1814F, 1814G, 1814H, 1814I, 1814J that, in response to being selected by the gaze G of the user U, perform actions that change the user interface 1804. In an example, the control window 1806 includes control objects 1814A, 1814B, 1814C, 1814D, 1814E, 1814F, 1814G, 1814H, 1814I, 1814J that, in response to being selected by the gaze G of the user U, perform actions relative to an item that 1811 is engaged by the indicator 1807 on the user interface 1804.

In an example, the method 2300 further includes [2328] detecting the presence of the sensor 1802 that observes the gaze G of the user U. The method 2300 may further include [2329] showing the user interface 1804 on the display 1803 that includes at least one item 1811 supporting gaze interaction with the user interface 1804 when the item 1811 is activated by the user's U gaze G (e.g., by using operating system 116). It should be noted that operations [2328] and [2329] may be performed at the beginning of the method 2300.

In an example, the control window 1806 is an indirect indicator control window similar to indirect indicator control windows 206, 1006 described above, where the indirect indicator control window includes a displayed area of the user interface 1803. In such forms, the indirect indicator control window may include control objects, similar to control objects 202A, 202B, 202C, 202D described above that, in response to being selected by the gaze G of the user U, move the indicator 1807 within the displayed area of the indirect indicator control window.

As shown in FIG. 20, the control window 1806 includes various control objects 1814A, 1814B, 1814C, 1814D that when "selected" by the gaze G of the user U (e.g., by sufficient dwell time on at least one of the control objects 1814A, 1814B, 1814C, 1814D) perform actions relative to an item 1811 that is engaged by the indicator 1807. As examples, the actions that may be performed relative to the item 1811 that is engaged by the indicator 1807 include at least one of a left click function 1814C, a right click function 1814B, a double click function 1814D, a drag-and-drop function 1814E. Other example types of actions include a control window 1806 closing function 1814A; an application manager opening function 1814F; an application switching function 1814G; a keyboard graphic opening function 1814H; and/or a computer volume adjusting 1800 function 1814I.

The systems and methods described herein use eye gaze and dwell to change the display of a computing device. Using eye gaze enables users to interact with user devices without manually (e.g., by hand, physical interaction, etc.) interacting with the user devices. The systems and methods described herein avoid problems related to imprecise eye tracking and unpredictable selection behavior. Furthermore, the systems and methods described herein enable the use of less accurate or less precise tracking components in order to reduce consumption of computational resources.

While eye gaze is discussed herein, one of ordinary skill in the art with the benefit of Applicant's disclosure will appreciate that other input devices may be utilized. For example, a sip-and-puff device, a mouth stick, or the like. In addition, while this disclosure has been described in terms of use for visually impaired or disabled persons, the techniques discussed in the present disclosure may be utilized for other purposes.

FIG. 24 illustrates a block diagram of an example machine 2400 upon which any one or more of the techniques (e.g., methodologies) discussed herein may perform. In alternative embodiments, the machine 2400 may operate as a standalone device or may be connected (e.g., networked) to other machines. In a networked deployment, the machine 2400 may operate in the capacity of a server machine, a client machine, or both in server-client network environments. In an example, the machine 2400 may act as a peer machine in peer-to-peer (P2P) (or other distributed) network environment. The machine 2400 may be a computing device such as a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 2400 may implement the operations shown and described herein, and implement the computing devices 100, 200, 1000, 1800 and 2400 described herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Examples, as described herein, may include, or may operate on, logic or a number of components, modules, or mechanisms. Components, modules, or mechanisms are tangible entities (e.g., hardware) capable of performing specified operations and may be configured or arranged in a certain manner. In an example, circuits may be arranged (e.g., internally or with respect to external entities such as other circuits) in a specified manner as components, modules, or mechanisms. In an example, the whole or part of one or more computer systems (e.g., a standalone, client or server computer system) or one or more hardware processors may be configured by firmware or software (e.g., instructions, an application portion, or an application) as components, modules, or mechanisms that operate to perform specified operations. In an example, the software may reside on a machine readable medium. In an example, the software, when executed by the underlying hardware of the module, causes the hardware to perform the specified operations.

Accordingly, the terms component, module, or mechanism is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components, modules, or mechanisms are temporarily configured, each of the components, modules, or mechanisms need not be instantiated at any one moment in time. For example, where the components, modules, or mechanisms comprise a general-purpose hardware processor configured using software, the general-purpose hardware processor may be configured as respective different components, modules, or mechanisms at different times. Software may accordingly configure a hardware processor, for example, to constitute particular components, modules, or mechanisms at one instance of time and to constitute different components, modules, or mechanisms at a different instance of time.

Machine (e.g., computer system) 2400 may include a hardware processor 2402 (e.g., a central processing unit (CPU), a graphics processing unit (GPU), a hardware processor core, or any combination thereof), a main memory 2404 and a static memory 2406, some or all of which may communicate with each other via an interlink (e.g., bus) 2408. The machine 2400 may further include a display unit 2410, an alphanumeric input device 2412 (e.g., a keyboard), and a user interface (UI) navigation device 2414 (e.g., a mouse). In an example, the display unit 2410, input device 2412 and UI navigation device 2414 may be a touch screen display. The machine 2400 may additionally include a storage device (e.g., drive unit) 2416, a signal generation device 2418 (e.g., a speaker), a network interface device 2420, and one or more sensors 2421, such as a global positioning system (GPS) sensor, compass, accelerometer, or other sensor. The machine 2400 may include an output controller 2428, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The storage device 2416 may include a machine readable medium 2422 on which is stored one or more sets of data structures or instructions 2424 (e.g., software) embodying or utilized by any one or more of the techniques or functions described herein. The instructions 2424 may also reside, completely or at least partially, within the main memory 2404, within static memory 2406, or within the hardware processor 2402 during execution thereof by the machine 2400. In an example, one or any combination of the hardware processor 2402, the main memory 2404, the static memory 2406, or the storage device 2416 may constitute machine readable media.

While the machine readable medium 2422 is illustrated as a single medium, the term "machine readable medium" may include a single medium or multiple media (e.g., a centralized or distributed database, and/or associated caches and servers) configured to store the one or more instructions 2424.

The term "machine readable medium" may include any medium that is capable of storing, encoding, or carrying instructions for execution by the machine 2400 and that cause the machine 2400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In an example, machine readable media may include non-transitory machine readable media. In an example, machine readable media may include machine readable media that is not a transitory propagating signal.

The instructions 2424 may further be transmitted or received over a communications network 2426 using a transmission medium via the network interface device 2420. The Machine 2400 may communicate with one or more other machines utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.24.4 family of standards, a Long Term Evolution (LTE) family of standards, a Universal Mobile Telecommunications System (UMTS) family of standards, peer-to-peer (P2P) networks, among others. In an example, the network interface device 2420 may include one or more physical jacks (e.g., Ethernet, coaxial, or phone jacks) or one or more antennas to connect to the communications network 2426. In an example, the network interface device 2420 may include a plurality of antennas to wirelessly communicate using at least one of single-input multiple-output (SIMO), multiple-input multiple-output (MIMO), or multiple-input single-output (MISO) techniques. In an example, the network interface device 2420 may wirelessly communicate using Multiple User MIMO techniques.

To better illustrate the systems, method and apparatuses disclosed herein, a non-limiting list of embodiments is provided herein:

Example 1 is a system for interacting with a user interface on a display, the system comprising: a processor; a memory communicatively coupled to the processor and including instructions, which when executed by the processor cause the system to perform operations comprising: receiving data from a sensor, the sensor observes a gaze of a user; detecting gaze coordinates of the user's gaze; detecting the user's gaze within a predetermined threshold distance of the gaze coordinates for at least a predetermined time period; displaying an indicator as an object within the user interface at the gaze coordinates once the user's gaze occurs for at least the predetermined time period at the gaze coordinates; presenting an indirect indicator control window on the user interface, wherein the indirect indicator control window includes, a transparent section to allow a user to see an area of the user interface at the gaze coordinates; and wherein the indirect indicator control window includes at least one control object that, in response to being selected by the gaze of the user, moves the indirect indicator control window within the user interface.

In Example 2, the subject matter of Example 1 includes, wherein the at least one control object includes multiple direction buttons that move the indicator within the user interface in a corresponding direction.

In Example 3, the subject matter of Examples 1-2 includes, wherein the indicator is a cursor.

In Example 4, the subject matter of Examples 1-3 includes, wherein the operations comprise: detecting the presence of the sensor that observes the gaze of the user; and outputting the user interface on the display, wherein the user interface includes at least one control object supporting gaze interaction with the user interface once the control object is activated by the user's gaze.

In Example 5, the subject matter of Examples 1-4 includes, wherein at least one of the processor and the memory includes an operating system that, which when executed by the processor cause the system to present the user interface on a display.

In Example 6, the subject matter of Examples 1-5 includes, wherein the indirect indicator control window includes control objects that, in response to being selected by the gaze of the user, perform actions relative to an item that is engaged by the indicator.

In Example 7, the subject matter of Example 6 includes, wherein the actions performed relative to the item that is engaged by the indicator include at least one a left click function, a right click function, a double click function or a drag-and drop function.

Example 8 is a system for interacting with a user interface on a display, the system comprising: a processor; a memory communicatively coupled to the processor and including instructions, which when executed by the processor cause the system to perform the operations comprising: receiving data from a sensor, the sensor to observe a gaze of a user; detecting gaze coordinates of the user's gaze, the gaze coordinates being near a border of the display; detecting the user's gaze within a predetermined threshold distance of the gaze coordinates for at least a predetermined time period; displaying an indicator as an object within the user interface at the gaze coordinates once the user's gaze occurs for at least the predetermined time period at the gaze coordinates;

presenting an indirect indicator control window on the user interface that includes, an at least partially transparent section to allow a user to see an area of the user interface at the gaze coordinates; and wherein the partially transparent section of the indirect indicator control window shows a portion of the user interface near the border and a representation of at least a portion of the border of the display.

In Example 9, the subject matter of Example 8 includes, wherein the portion of the border includes at least one of an edge of the border and a corner of the border.

In Example 10, the subject matter of Examples 8-9 includes, wherein the indicator is a cursor.

In Example 11, the subject matter of Examples 8-10 includes, wherein at least one of the processor and the memory includes an operating system that, which when executed by the processor cause the system to present the user interface on a display.

In Example 12, the subject matter of Examples 8-11 includes, wherein the operations comprise: detecting the presence of the sensor that observes the gaze of the user; and showing a user interface that includes at least one item near the border of the display that supports gaze interaction with the user interface once the item is activated by the user's gaze.

In Example 13, the subject matter of Examples 8-12 includes, wherein the indirect indicator control window is opaque, and wherein the indirect indicator control window reproduces contents of the user interface below the indirect indicator control window and renders an image of the user interface and a border of the user interface.

In Example 14, the subject matter of Examples 8-13 includes, wherein the indirect indicator control window includes control objects that, in response to being selected by the gaze of the user, move the indicator within the displayed area.

Example 15 is a system for interacting with a user interface on a display, the system comprising: a processor; a memory communicatively coupled to the processor and including instructions, which when executed by the processor cause the system to perform the operations comprising: receiving data from a sensor, the sensor to observe a gaze of a user; detecting gaze coordinates of the user's gaze; detecting the user's gaze within a predetermined threshold distance of the gaze coordinates for at least a predetermined time period; displaying an indicator as an object within the user interface at the gaze coordinates once the user's gaze occurs for at least the predetermined time period at the gaze coordinates; presenting a control window on the user interface at the gaze coordinates; and the control window includes, control objects that, in response to being selected by the gaze of the user, perform actions that change the user interface.

In Example 16, the subject matter of Example 15 includes, wherein the control window includes control objects that, in response to being selected by the gaze of the user, perform actions relative to an item that is engaged by the indicator on the user interface.

In Example 17, the subject matter of Example 16 includes, wherein the actions performed relative to the item that is engaged by the indicator include at least one a left click function, a right click function, a double click function or a drag-and drop function.

In Example 18, the subject matter of Examples 15-17 includes, wherein the control window is an indirect indicator control window that includes a displayed area of the user interface, the indirect indicator control window including control objects that, in response to being selected by the gaze of the user, move the indirect indicator control window.

In Example 19, the subject matter of Examples 15-18 includes, wherein the indicator is a cursor and detecting eye control by the user at the gaze coordinates comprises detecting the user's gaze within a predetermined threshold distance of a set coordinates for at least a predetermined time period.

In Example 20, the subject matter of Examples 15-19 includes, wherein the operations comprise: detecting the presence of the sensor that observes the gaze of the user; and showing the user interface on the display that includes at least one item supporting gaze interaction with the user interface once the item is activated by the user's gaze.

Example 21 is a method to perform any of Examples 1-20.

Example 22 is a computer readable medium to perform any of Examples 1-21.

What is claimed is:

1. A system for interacting with a user interface on a display, the system comprising:
    a processor;
    a memory communicatively coupled to the processor and including instructions, which when executed by the processor cause the system to perform operations comprising:
    receiving data from a sensor, the sensor observes a gaze of a user;
    detecting gaze coordinates of the user's gaze;
    detecting the user's gaze within a predetermined threshold distance of the gaze coordinates for at least a predetermined time period;
    displaying an indicator as an object within the user interface at the gaze coordinates once the user's gaze occurs for at least the predetermined time period at the gaze coordinates;
    presenting an indirect indicator control window on the user interface, wherein the indirect indicator control window includes a transparent section to allow a user to see an area of the user interface at the gaze coordinates; and
    wherein the indirect indicator control window includes at least one directional control object that, in response to being selected by the gaze of the user, moves the indirect indicator control window within the user interface.

2. The system of claim 1, wherein the at least one directional control object includes multiple direction buttons that move the indicator within the user interface in a corresponding direction.

3. The system of claim 1, wherein the indicator is a cursor.

4. The system of claim 1, wherein the operations comprise:
    detecting the presence of the sensor that observes the gaze of the user; and
    outputting the user interface on the display, wherein the user interface includes at least one control object supporting gaze interaction with the user interface once the control object is activated by the user's gaze.

5. The system of claim 1, wherein at least one of the processor and the memory includes an operating system that, which when executed by the processor cause the system to present the user interface on a display.

6. The system of claim 1, wherein the indirect indicator control window includes control objects that, in response to being selected by the gaze of the user, perform actions relative to an item that is engaged by the indicator.

7. The system of claim 6, wherein the actions performed relative to the item that is engaged by the indicator include at least one a left click function, a right click function, a double click function or a drag-and drop function.

8. A system for interacting with a user interface on a display, the system comprising:
- a processor;
- a memory communicatively coupled to the processor and including instructions, which when executed by the processor cause the system to perform the operations comprising:
- receiving data from a sensor, the sensor to observe a gaze of a user;
- detecting gaze coordinates of the user's gaze, the gaze coordinates being near a border of the display;
- detecting the user's gaze within a predetermined threshold distance of the gaze coordinates for at least a predetermined time period;
- displaying an indicator as an object within the user interface at the gaze coordinates once the user's gaze occurs for at least the predetermined time period at the gaze coordinates;
- presenting an indirect indicator control window on the user interface that includes an at least partially transparent section to allow a user to see an area of the user interface at the gaze coordinates; and
- wherein the partially transparent section of the indirect indicator control window shows a portion of the user interface near the border and a representation of at least a portion of the border of the display.

9. The system of claim 8, wherein the portion of the border includes at least one of an edge of the border and a corner of the border.

10. The system of claim 8, wherein the indicator is a cursor.

11. The system of claim 8, wherein at least one of the processor and the memory includes an operating system that, which when executed by the processor cause the system to present the user interface on a display.

12. The system of claim 8, wherein the operations comprise:
- detecting the presence of the sensor that observes the gaze of the user; and
- showing a user interface that includes at least one item near the border of the display that supports gaze interaction with the user interface once the item is activated by the user's gaze.

13. The system of claim 8, wherein the indirect indicator control window is opaque, and wherein the indirect indicator control window reproduces contents of the user interface below the indirect indicator control window and renders an image of the user interface and a border of the user interface.

14. The system of claim 8, wherein the indirect indicator control window includes control objects that, in response to being selected by the gaze of the user, move the indicator within the displayed area.

15. A system for interacting with a user interface on a display, the system comprising:
- a processor;
- a memory communicatively coupled to the processor and including instructions, which when executed by the processor cause the system to perform the operations comprising:
- receiving data from a sensor, the sensor to observe a gaze of a user;
- detecting gaze coordinates of the user's gaze;
- detecting the user's gaze within a predetermined threshold distance of the gaze coordinates for at least a predetermined time period;
- displaying an indicator as an object within the user interface at the gaze coordinates once the user's gaze occurs for at least the predetermined time period at the gaze coordinates;
- presenting a control window on the user interface at the gaze coordinates; and
- the control window includes control objects that; in response to being selected by the gaze of the user, perform actions that change the user interface.

16. The system of claim 15, wherein the control window includes control objects that; in response to being selected by the gaze of the user, perform actions relative to an item that is engaged by the indicator on the user interface.

17. The system of claim 16, wherein the actions performed relative to the item that is engaged by the indicator include at least one a left click function, a right click function, a double click function or a drag-and drop function.

18. The system of claim 15, wherein the control window is an indirect indicator control window that includes a displayed area of the user interface, the indirect indicator control window including control objects that, in response to being selected by the gaze of the user, move the indirect indicator control window.

19. The system of claim 15, wherein the indicator is a cursor and detecting eye control by the user at the gaze coordinates comprises detecting the user's gaze within a predetermined threshold distance of a set coordinates for at least a predetermined time period.

20. The system of claim 15, wherein the operations comprise:
- detecting the presence of the sensor that observes the gaze of the user; and
- showing the user interface on the display that includes at least one item supporting gaze interaction with the user interface once the item is activated by the user's gaze.

* * * * *